(12) United States Patent
LaPier et al.

(10) Patent No.: US 11,789,590 B2
(45) Date of Patent: *Oct. 17, 2023

(54) USER INTERFACE FOR CONTENT SHARING CLIENT IN A DESKTOP FILE SYSTEM CONTEXT

(71) Applicant: Dropbox, Inc., San Francisco, CA (US)

(72) Inventors: Philip LaPier, San Francisco, CA (US); Maxime Larabie-Belanger, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,621

(22) Filed: Jan. 31, 2022

(65) Prior Publication Data

US 2022/0155921 A1  May 19, 2022

Related U.S. Application Data

(63) Continuation of application No. 16/685,952, filed on Nov. 15, 2019, now Pat. No. 11,269,490, which is a
(Continued)

(51) Int. Cl.
*G06F 17/00* (2019.01)
*G06F 3/0482* (2013.01)
(Continued)

(52) U.S. Cl.
CPC ............ *G06F 3/0482* (2013.01); *G06F 16/93* (2019.01); *G06F 40/123* (2020.01);
(Continued)

(58) Field of Classification Search
CPC .................... G06F 3/0482; G06F 16/93
(Continued)

(56) References Cited

U.S. PATENT DOCUMENTS 7,966,565 B2 * 6/2011 Dawson ............. H04N 1/00244
715/733
8,307,046 B2 * 11/2012 Ortiz ..................... H04N 1/2183
709/217
(Continued)

OTHER PUBLICATIONS

Final Office Action from U.S. Appl. No. 16/685,952, dated Oct. 18, 2021, 21 pages.
(Continued)

*Primary Examiner* — Stephen S Hong
*Assistant Examiner* — Matthew J Ludwig
(74) *Attorney, Agent, or Firm* — Fenwick & West LLP

(57) ABSTRACT

Described embodiments enable device users to share content items directly from the context of a desktop file system user interface. A share bar is displayed in the file system user interface, where the share bar includes one or more graphical control elements that provide additional functionality with respect to one or more selected content items in the user interface. The additional functionality can include sharing the selected item, moving the item, downloading the item, and viewing sharing status, version history, completion status, comments, or other information about the item.

20 Claims, 26 Drawing Sheets

Related U.S. Application Data continuation of application No. 15/339,729, filed on Oct. 31, 2016, now Pat. No. 10,540,059.

(60) Provisional application No. 62/377,481, filed on Aug. 19, 2016.

(51) Int. Cl.
*G06F 16/93* (2019.01)
*G06F 40/123* (2020.01)
*G06F 40/166* (2020.01)
*G06F 40/169* (2020.01)
*G06F 40/197* (2020.01)

(52) U.S. Cl.
CPC .......... *G06F 40/166* (2020.01); *G06F 40/169* (2020.01); *G06F 40/197* (2020.01)

(58) Field of Classification Search
USPC ........................................................ 715/748
See application file for complete search history.

(56) References Cited

U.S. PATENT DOCUMENTS

| | | | |
|---|---|---|---|
| 8,943,027 B1 | 1/2015 | Dwan et al. | |
| 9,282,169 B1 | 3/2016 | Chang | |
| 10,540,059 B2 * | 1/2020 | LaPier | G06F 3/0482 |
| 10,984,444 B2 * | 4/2021 | Mody | G06Q 30/0255 |
| 11,258,869 B2 * | 2/2022 | Rusinov | H04L 67/535 |
| 2009/0164923 A1 * | 6/2009 | Ovi | G06F 3/0482 |
| | | | 715/764 |
| 2012/0110515 A1 * | 5/2012 | Abramoff | G06F 16/904 |
| | | | 715/854 |
| 2012/0150970 A1 | 6/2012 | Peterson et al. | |
| 2012/0331108 A1 | 12/2012 | Ferdowsi et al. | |
| 2013/0067303 A1 | 3/2013 | Kantor et al. | |
| 2013/0182974 A1 * | 7/2013 | Smith | G06F 16/93 |
| | | | 382/306 |
| 2013/0275509 A1 | 10/2013 | Micucci et al. | |
| 2013/0332856 A1 | 12/2013 | Sanders et al. | |
| 2014/0201848 A1 * | 7/2014 | Kulkarni | G06Q 10/101 |
| | | | 715/205 |
| 2014/0282016 A1 | 9/2014 | Hosier, Jr. | |
| 2015/0058737 A1 | 2/2015 | Yan et al. | |
| 2015/0082198 A1 | 3/2015 | Destagnol et al. | |
| 2015/0177954 A1 * | 6/2015 | Wei | G06F 3/0482 |
| | | | 715/738 |
| 2015/0180980 A1 | 6/2015 | Welinder et al. | |
| 2015/0295872 A1 | 10/2015 | Hawryluk et al. | |
| 2015/0363481 A1 * | 12/2015 | Haynes | G06Q 10/10 |
| | | | 707/748 |
| 2016/0036822 A1 | 2/2016 | Kim et al. | |
| 2016/0073034 A1 | 3/2016 | Mukherjee et al. | |
| 2016/0085389 A1 | 3/2016 | Mahmud et al. | |
| 2017/0353410 A1 * | 12/2017 | Gonzales | H04L 51/063 |

OTHER PUBLICATIONS

Final Office Action from U.S. Appl. No. 16/685,952, dated Oct. 26, 2020, 32 pages.
Non-Final Office Action from U.S. Appl. No. 16/685,952, dated May 24, 2021, 21 pages.
Non-Final Office Action from U.S. Appl. No. 16/685,952, dated May 29, 2020, 30 pages.
Notice of Allowance from U.S. Appl. No. 15/339,729, dated Oct. 4, 2019, 8 pages.
Notice of Allowance from U.S. Appl. No. 16/685,952, dated Dec. 22, 2021, 9 pages.
Notice of Allowance from U.S. Appl. No. 15/339,729, dated Jan. 26, 2022, 3 pages.
Office action from U.S. Appl. No. 15/339,729, dated Mar. 8, 2019, 26 pages.
Office action from U.S. Appl. No. 15/339,729, dated Nov. 19, 2018, 20 pages.

* cited by examiner

USER INTERFACE FOR CONTENT SHARING CLIENT IN A DESKTOP FILE SYSTEM CONTEXT

CROSS REFERENCE TO RELATED APPLICATIONS

This application is a continuation of U.S. application Ser. No. 16/685,952, filed Nov. 15, 2019, now U.S. Pat. No. 11,269,490, which application is a continuation of U.S. application Ser. No. 15/339,729, filed Oct. 31, 2016, now U.S. Pat. No. 10,540,059, which application claims the benefit of U.S. Provisional Application No. 62/377,481, filed Aug. 19, 2016, all of which are incorporated by reference in their entirety.

BACKGROUND

This disclosure generally relates to sharing information among devices, and particularly to the user interface of a content sharing client application.

Content management systems permit devices to synchronize content items with the content management system and other devices. A device stores a local copy of content items. The device executes a client application that interacts with the content management. When content items are added, deleted, and edited on a device, the client application sends the modification information are sent to the content management system for storage and synchronization with other devices. The client application needs to provide an interface by which users can readily share content items with other users.

Conventionally, client applications use menus, such as context-menu (or "right click" menu) that contains menu options related to content sharing. The problem with context-menus, however, is that a significant percentage of users are not aware of the context menu or how to use it. In other words, many users simply do not know how or when to invoke a context menu. Even if a user knows of the context menu, it will typically include a larger number of unrelated menu options from multiple different applications; context menus with over a twenty different menu items are common. The large number of items from multiple applications makes it difficult for a user to identify which menu options are relevant to content sharing.

The complexity of current context menu approaches has resulted in numerous specific problems. For example, one problem with conventional file system interfaces is that users have difficulty determining how to share content items shown in the file system interface as an email application attachment, since at the time they are viewing the content item and desire to send it, they are in the file system, not in their email program. Switching to the email program results in a loss of context: the user has to create a new email item and then use a file attachment function in the email program. This change of context from the file system interface to the email system interface is unintuitive and confusing for some users since it disrupts their expected workflow and focus of activities within the file system interface.

Another problem with context menus approaches is that users have difficulty sharing multiple files at once. Many users assume that the context menu is only applicable to a single selected item in the user interface. It is unclear to some users how the context menu operates when multiple items are selected.

SUMMARY OF THE INVENTION

Various embodiments overcome the problems of sharing content items within the user interface of a file system, and specifically the problems associated with using context menu. In one embodiment, a file system interface is displayed on a client device, where the file system interface includes one or more file system content items, which can be either a file or a folder. A selection of one or more of the content items in the file system interface is detected, and automatically in response to the detecting the selection of the content item, a share bar graphical element is displayed in the file system interface. The share bar graphical element includes a share button which is programmatically associated with a function to share the selected content item. A selection of the share button while the content item is selected is then detected, and automatically in response to detecting the selection of the share button, a first interface is configured to receive at least one recipient for the selected content item. An identification of at least one recipient is received in the first interface in response to an indication to share the selected content item. A message including the identified recipients, and identification information of the selected content item is then transmitted to a content management system, where the content management system associates the identified recipients with the selected content item in the content management system.

The share button can be automatically labeled to indicate a number and type of the selected content item, the type being either a folder or a file.

The client device can further display a notification that the selected content item has been associated with the identified recipients.

The share bar graphical element can be displayed as an overlay in front of a file system interface window containing the file system content item.

The share bar graphical element can display an indication of a number of comments associated with a selected content item.

The share bar graphical element can display a file history of the selected content item, the file history indicating at least one version of the selected content item.

The share bar graphical element can display an icon for each other user with whom the selected content item is currently associated in the content management system.

The share bar graphical element can display an icon for another user with whom the selected content item is currently associated in the content management system and further indicated an activity status of the other user with respect to the selected content item.

The share bar graphical element can display a copy link graphical element associated with a function to request the content management system to generate a hyperlink to the selected content item in a content storage in the content management system.

The share bar graphical element can display a graphical element associated with a function to establish access privileges for each other user having access to the selected content item.

The share bar graphical element can display a graphical element indicating a completion status of the selected content item, the completion status including one of a draft status and a final status.

The share bar graphical element can display a graphical element associated with a function to cause the content management system to send a message to a recipient to provide at least one content item to the selected folder content item.

The share bar graphical element can display a graphical element associated with a function to cause the content management system to synchronize the selected content item from the client device to a storage of the content management system, and associated the synchronized content item with a user account associate with a user of the client device.

The share bar graphical element can display a graphical element associated with a function to cause the content management system to download the selected content item to a second client device associated with a user account in the content management system.

The share bar graphical element can be displayed in a minimized state such that only the share button and a control element to display the share bar in a maximized state are visible.

When displaying the share bar graphical element, at least one user contact can be determined, and then an icon of the at least one user contact can be displayed, and responsive to receiving a selection of one of the displayed icon, the first interface can be displayed prepopulated with identification information for the selected contact.

The first interface can include a field configured to receive a message associated with the selected content item, and wherein the content management system can then transmit the message to the identified recipients in associated with the selected content item.

The figures illustrate various embodiments for the purposes of description only. Other variations and embodiments of the feature and functionality of share bar may have a different appearance and design elements.

DETAILED DESCRIPTION

Overview of Sharing User Interface and Workflow

A sharing client application of a content management system executes on a client device. The client application is configured to enable the user to readily share content items, e.g., files and folders, directly from within the context of native file system interface provided by the operating system of the client device, by modifying the presentation of the file system user interface. The following figures illustrate the user interface structure and functional behavior of the client application.

Figure 1:
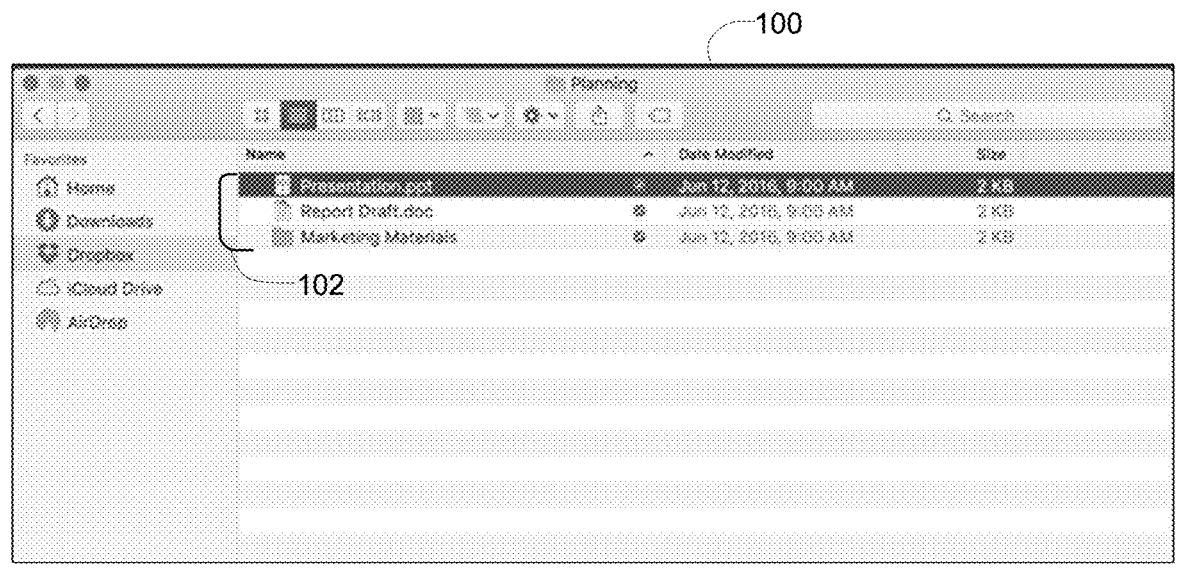
FIG. 1 is an illustration of a prior art user interface for a file system user interface window.

FIG. 1 shows an example of a prior art file system window 100 of a file system interface, e.g. a file browser, as it appears without modification by the client application (not shown are other portions of the file system interface, such as the desktop, application menu, status menu, application and folder dock or launcher, system menu, and so forth). In this view, the file browser includes a file system window that contains a list of content items 102, including files and/or folders. Here, the user has selected a file "Presentation.ppt" that the user wishes to share, but there is no information automatically provided by the native file system browser in response to the selection of the file indicating that this file can now be shared. Conventionally then the user would have to take additional steps, such as activating a context menu using a "right-click" or other context-menu activation modality, to determine whether that the file can be shared. The absence of any user interface element automatically provided in the file system interface hinders the user's ability to know what actions related to sharing the file are available.

Figure 2:
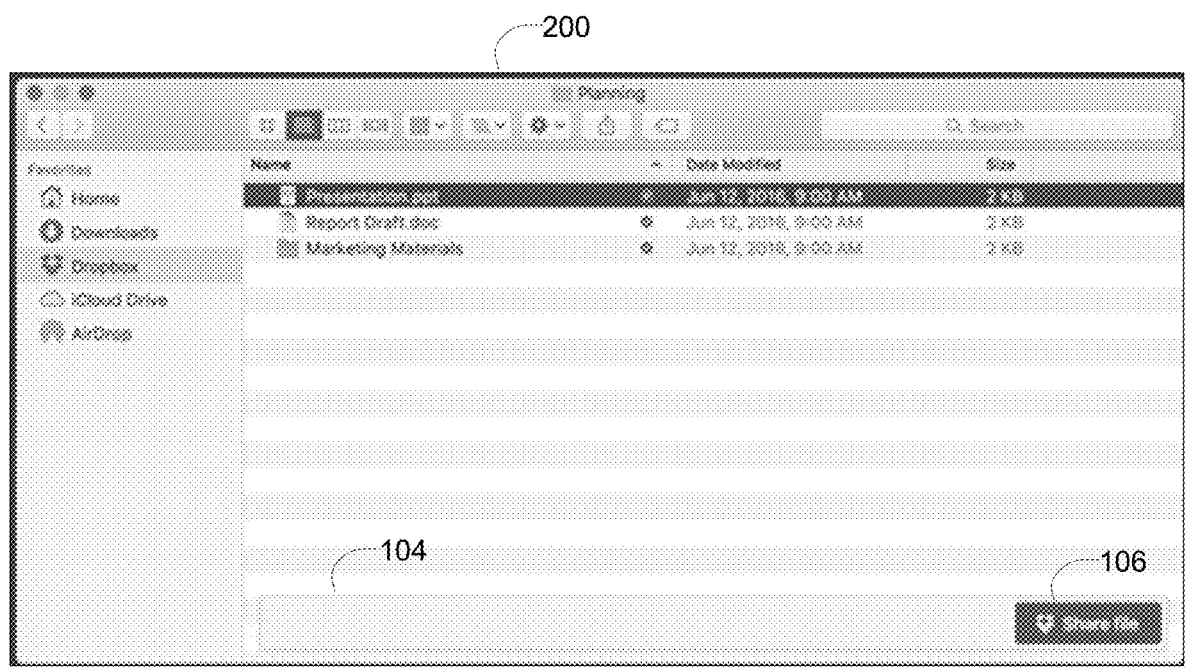
FIG. 2 is an illustration of a file system browser user interface window with a share bar

FIG. 2 illustrates a file system window 200 of the file system as modified by a sharing client application of a content management system. Now, in response to detecting the user selection of the file "Presentation.ppt" 102 the client application modifies the file system user interface by automatically displaying in the file system interface a graphical element 104 configured to provide accessing to a sharing function of the client application; for purposes of reference the graphical element 104 is called a "share bar," In this embodiment, the share bar 104 is displayed as an overlay (in front of, in the z-plane) to the file system window 200, at the bottom of the file system window; alternatively, the share bar 104 can be displayed in the file system interface by being directly integrated into the lower portion of the file system window.

Figure 3A:
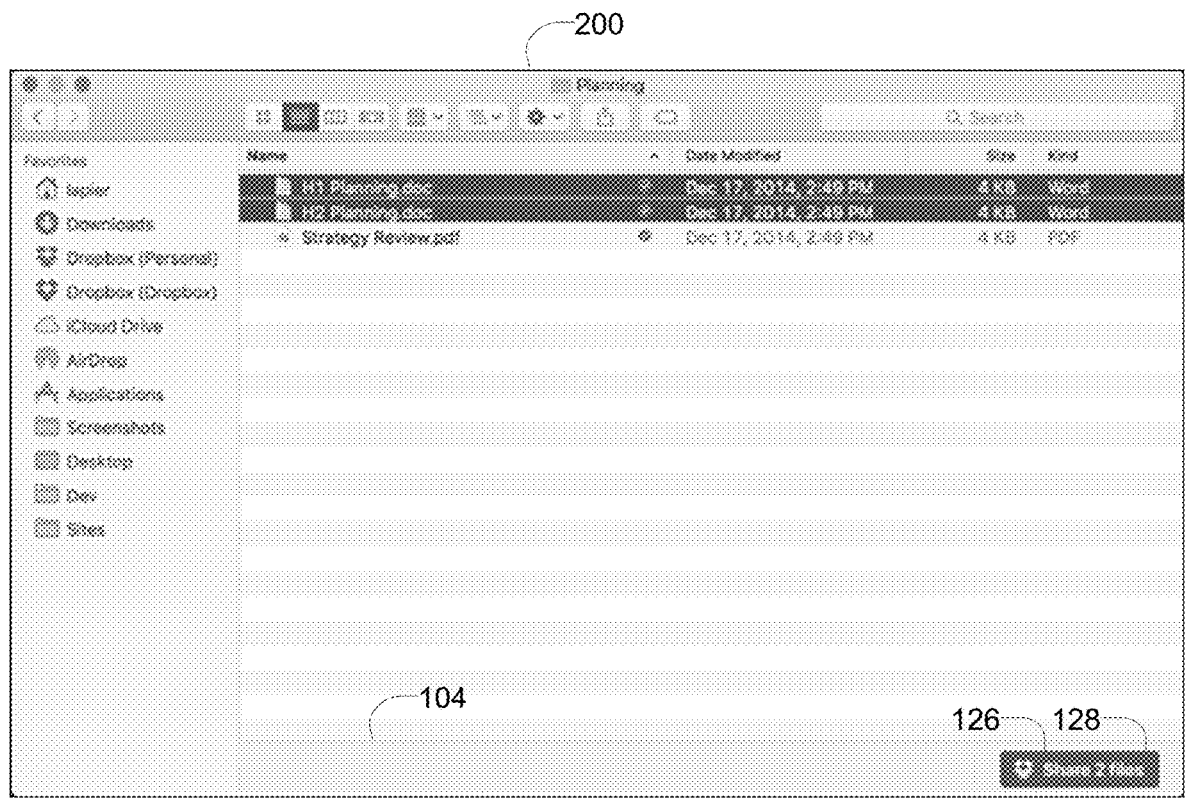
FIGS. 3A-3B are illustrations of a file system user interface window with share bar showing indication for sharing multiple files and folders.

The share bar 104 includes at least a share button 106 that indicates the type of selected content item to be shared, e.g. the text "Share file." If only one content item is selected, then the text is written in the singular. If multiple files were selected by the user, the share button includes the number 103 of selected files, as shown in FIG. 3A.

Figure 3B:
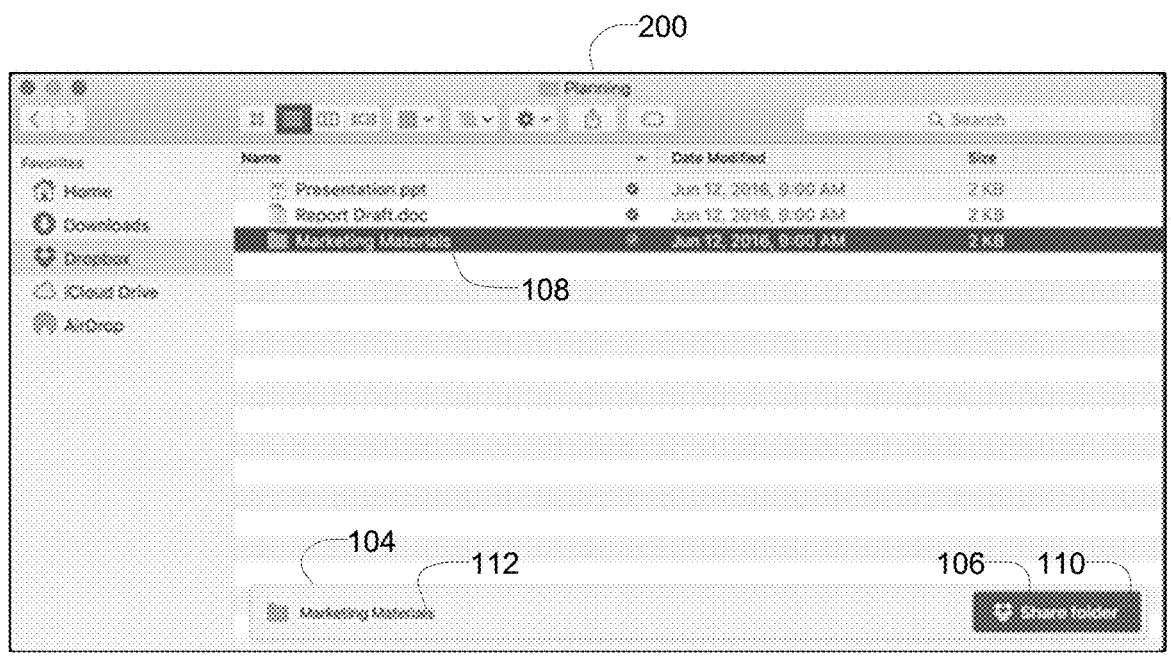

In addition to sharing files, the user can also select one or more folders 108 to share; the client application detects the selection and accordingly displays the type 110 of selected content item as a folder as shown in FIG. 3B.

Where the selected folder 108 has not already been shared with other users, then the folder name 112 is displayed in the share bar 104; if the folder 108 has already been shared with other users, other information is displayed, as further described below with respect to FIGS. 16-18.

Again, if only a single folder is selected, then the text for the share button 106 is in the singular; if multiple folders are selected, then share button 106 indicates the number of folders (e.g., "Share 3 folders"). In addition, in this illustrated embodiment, the name of the item to be shared in shown in the share bar 104.

The user can now immediately share the selected content item(s) by clicking on the share button 106. In response to detecting the click (or other action that activates the share button 106), the client application displays a dialog box, referenced here as "share sheet" 400.

Figure 4:
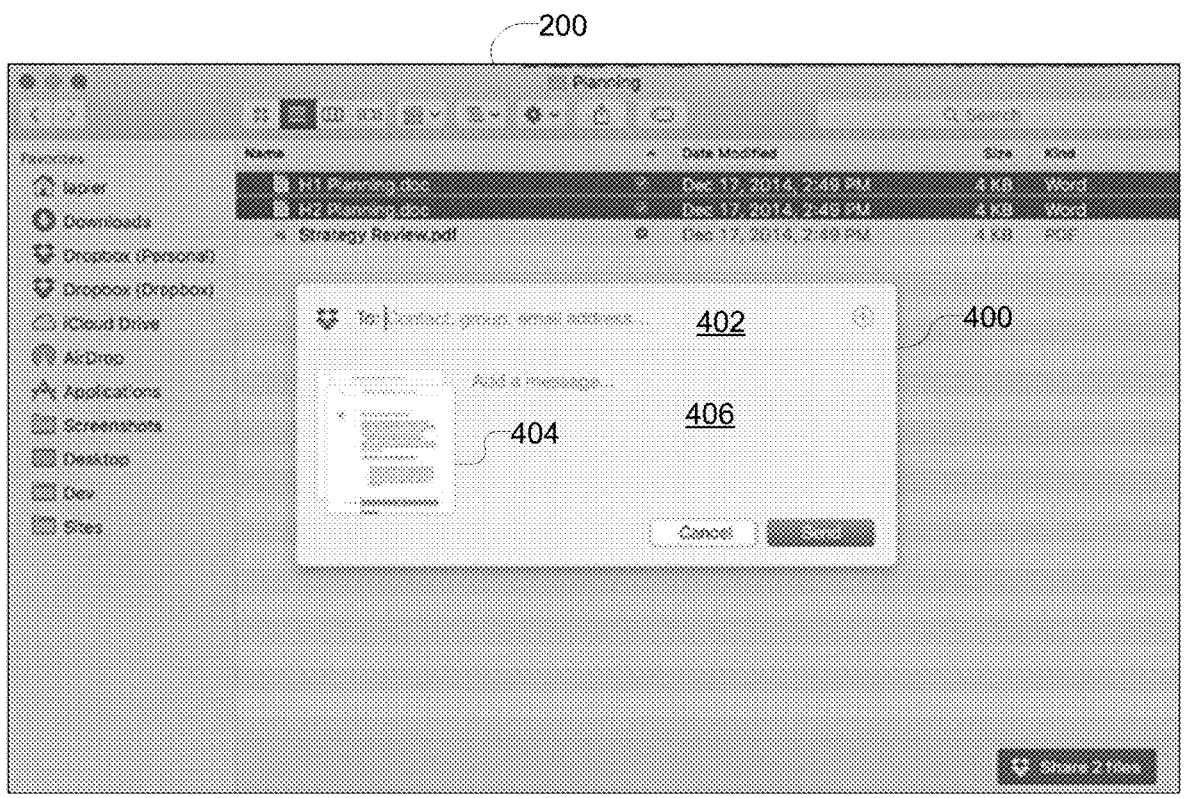
FIG. 4 is an illustration of a share sheet.

Referring to FIG. 4, the share sheet 400 is a modal dialog box that enables the user to identify easily one or more individuals (or groups) with whom to share the selected item(s) in the "To:" field 402. In this field, the user types the names of the recipients; as the user is inputting the names (on a character-by-character basis), the client application searches each new input in a contacts directory for the user; the contacts directory may be a local contacts directory maintained on the client device, a contacts directory maintained by the content management system, or a social networking contacts directory with which the client application has access privileges. Matching names are immediately populated to the To: field and the underlying addressing information (e.g., email address) is used to create a message object to the recipient; the message object will contain path information identifying the selected content items in the content management system.

Preferably the share sheet 400 includes a preview 404 rendering of at least one of the selected content items, such as the thumbnail rendering shown in FIG. 4.

Preferably the share sheet 400 includes a message field 406 in which the user can input a message associated with the items. The message text is included in the message object that is sent to the recipient(s).

Figure 5:
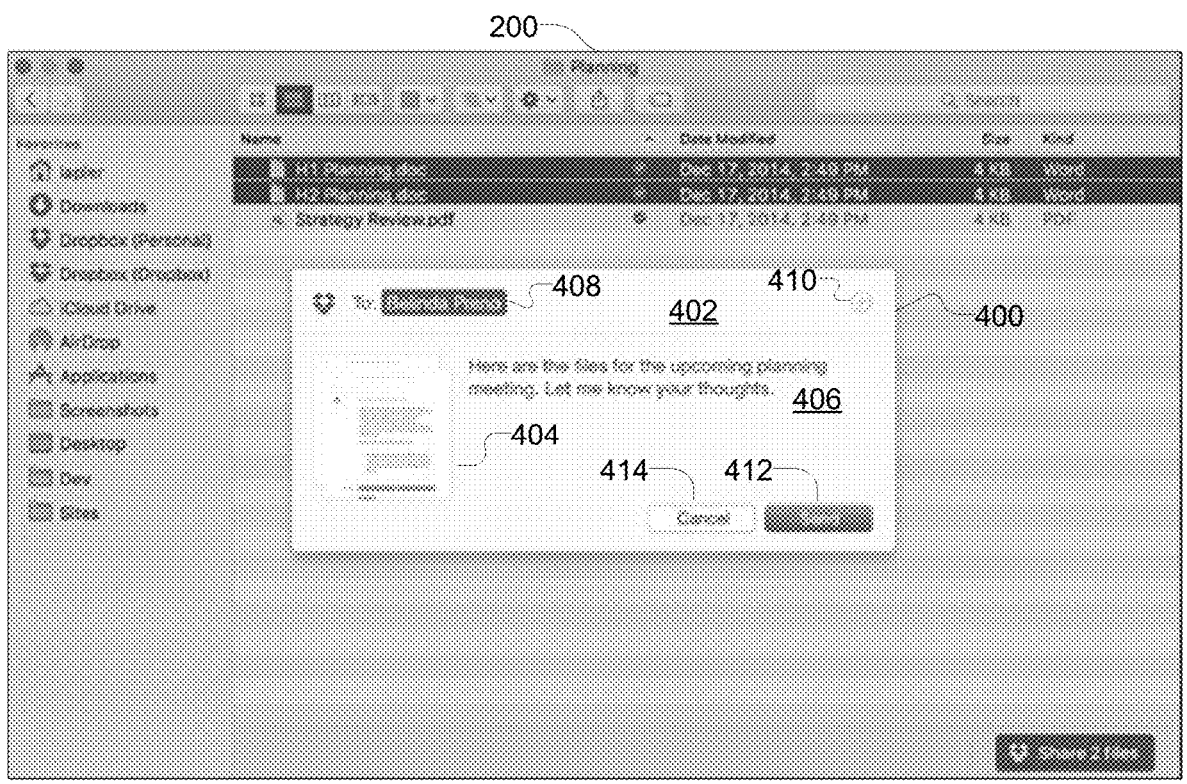
FIG. 5 is an illustration of the share sheet after the user has input a recipient name and a message.

FIG. 5 illustrates the share sheet 400 after the user has input a recipient name and a message. Here, because the recipient's name was matched to a name of a user of the content management system who already had an account with the content management system, the name 408 is shown in a distinguished format (e.g., boxed). If the name did not match an existing user, the user's email address or other identifying information would be shown.

To access the user's contact directory within the client application (or the content management system), the user can select the "plus icon" 410 shown in the share sheet 400. In response to the selection, the client application accesses its local contact directory and displays a list of available contacts.

Figure 6:
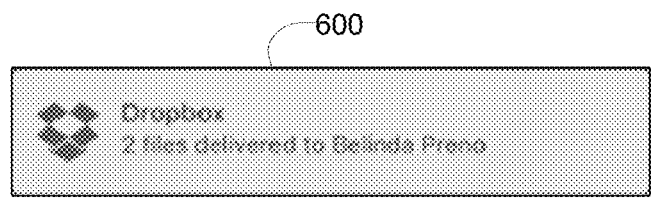
FIG. 6 is an illustration of an event notification.

The user can complete the sharing operation by selecting the "Send" button 412, or cancel the operation by selecting the "Cancel" button 414. The Send button 412 causes the client application to issue the message object to the content management system; the content management system then uses the addressing information and path name of the selected item to update its content directory to indicate that the identified recipient(s) is associated with the path name of the shared content items. An implementation of how the content item is shared is described below with respect to FIG. 32 and sharing module 3210 of the content management system 2910. When the event is completed, the content management system provides an event notification to the client device that the item(s) have been shared. FIG. 6 illustrates the event notification 606.

An implementation of event notification is described below with respect to FIG. 32 and the notification queue module 3220.

Figure 7:
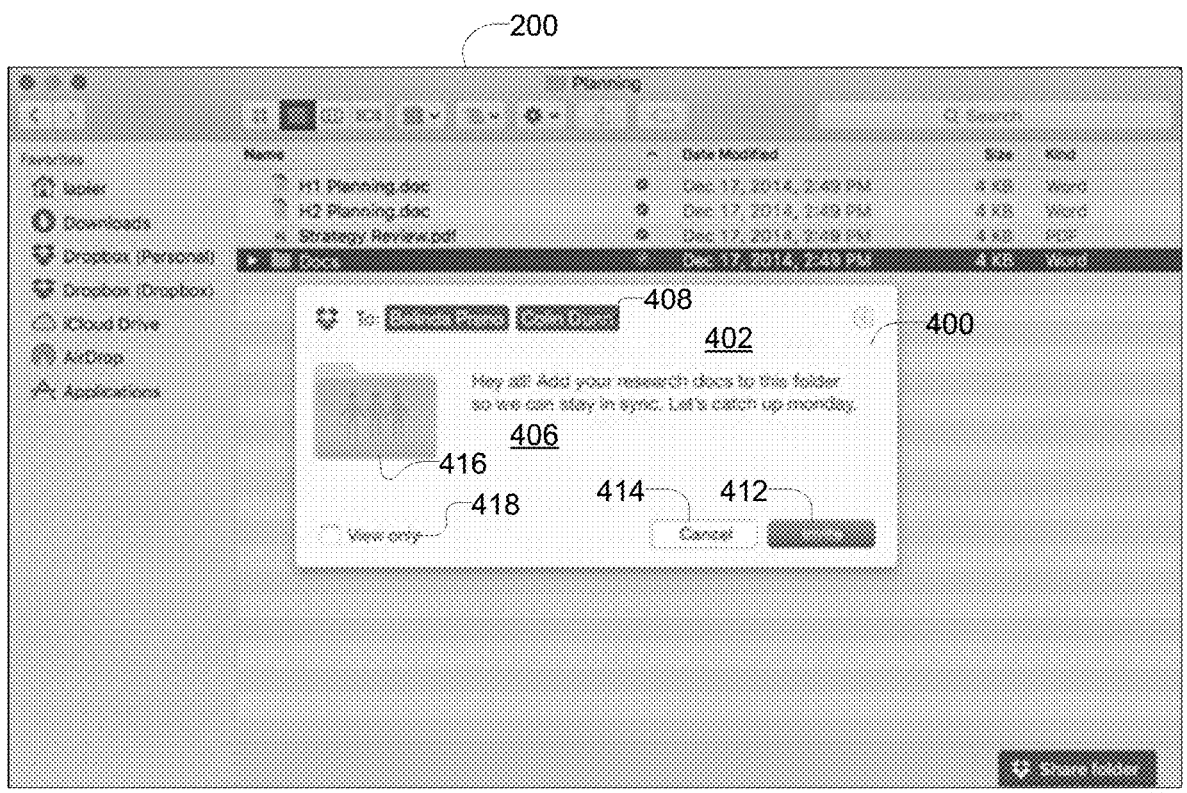
FIG. 7 is an illustration of the share sheet when sharing a folder.

The share sheet 400 dialog box is also used when sharing a folder. FIG. 7 illustrates the share sheet 400 when sharing a folder.

Here, the user has input two names 408, Belina Premo and Colin Dunn, and included a message 406. Here, because the content item is a folder, the "Send" button 412 is instead labeled "Invite". This change reflects an important change in the underlying semantics and functionality of the sharing operation. Sharing a folder gives the recipient access to whatever content items are contained in the folder; by contrast, sharing a file gives the recipient access only to the file itself. In one embodiment, the user can set the access privileges for the shared folder, for example by selecting the "view only" option 418 in the share sheet.

Quick Share

The share bar104 may be extended by the client application to provide increased functionality for more rapidly selecting a recipient for sharing selected item. In one embodiment, a Quick Share control 802 is displayed by the client application in the share bar 104 as illustrated in FIG. 8.

Figure 8:
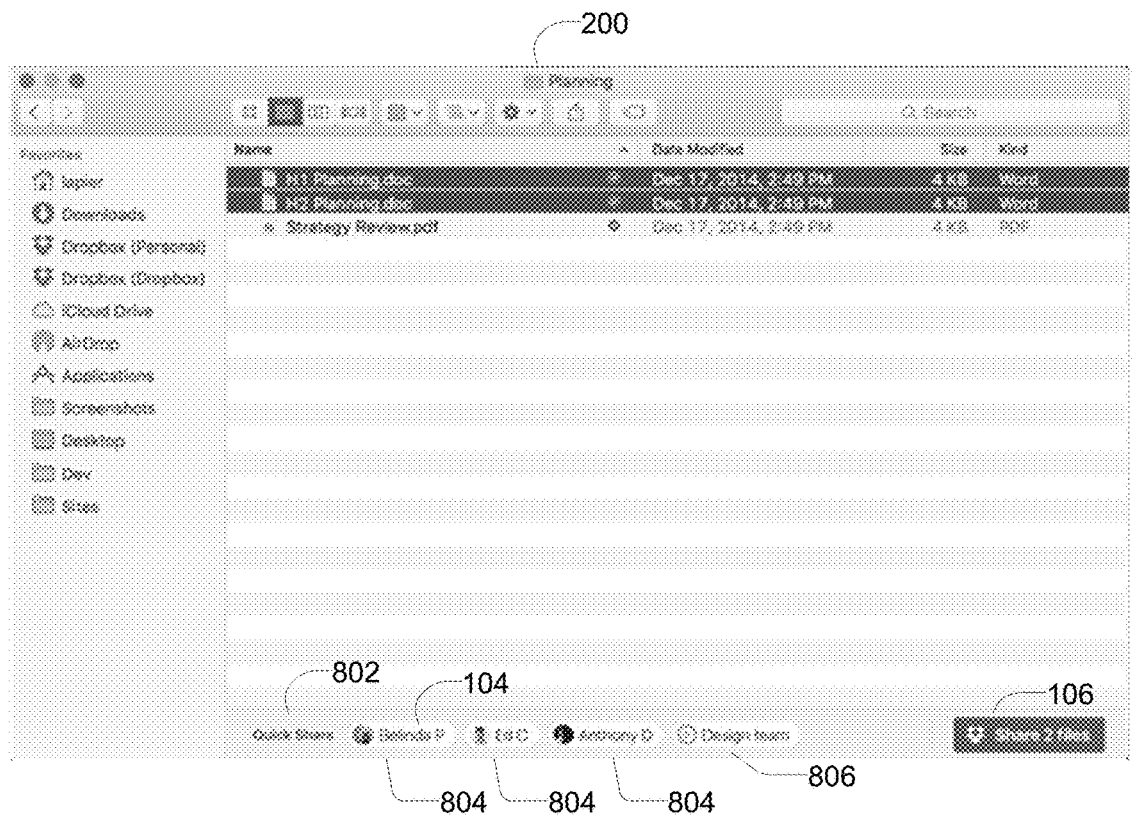
FIG. 8 is an illustration of the share bar with a quick share control element.

In FIG. 8 there is shown in the share bar 104 a Quick Share control element 802. This element lists a number (e.g., 5 or less) contacts of the user, shown by icon representations 804, which can include an identity of the contact (e.g., user name) and a graphic representation (e.g., image). The listed contacts are selected by the client application (or content management system) based on contacts that the user most recently, or more frequently (or a combination thereof) shared other content items with. Here, there are listed three individual contacts 804 and a distribution list 806 (which can also be a contact). The user can select one of these contacts; in response, the share sheet 400 is shown and immediately populated with the name of the selected contact.

Content Related Information and Functions in the Share bar

Comments

When a single file is selected, various types of information about the selected content item can be provided by the client application in the share bar, depending on the embodiment.

Figure 9:
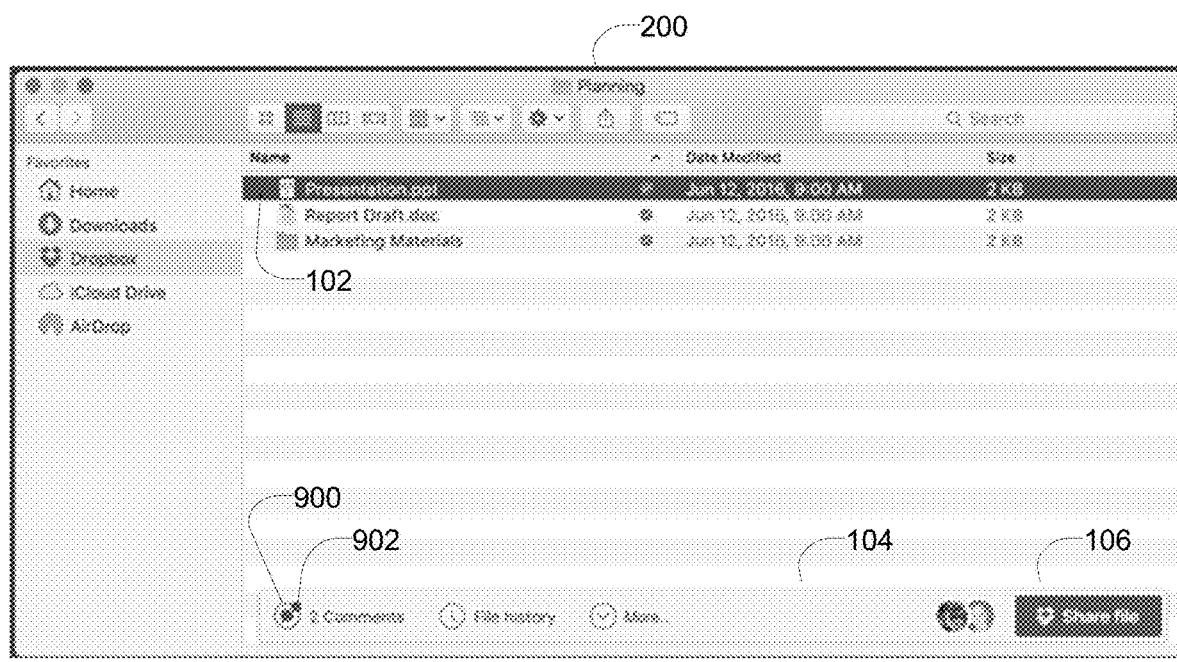
FIG. 9 is an illustration of the share bar with a comment indicator.

FIG. 9 illustrates one embodiment of additional information. In the embodiment of FIG. 9, the share bar 104 includes the following information. A comment indicator 900 shows the number of comments that have been made on the selected content item 102 by other users with whom the content item 102 is currently shared. This information is retrieved by the client application from the content management system for items that the user has previously shared with others (if the selected item is not already shared with other users, the number of comments is indicated as 0). The state of the comments is also indicated in comment indicator 900 by a status indicator graphical element 902 (e.g., the "red dot"); this indicates that there are new comments that have not been read by the current user. If all comments on the content item have been read, then the status indicator 902 is not present.

Figure 10:
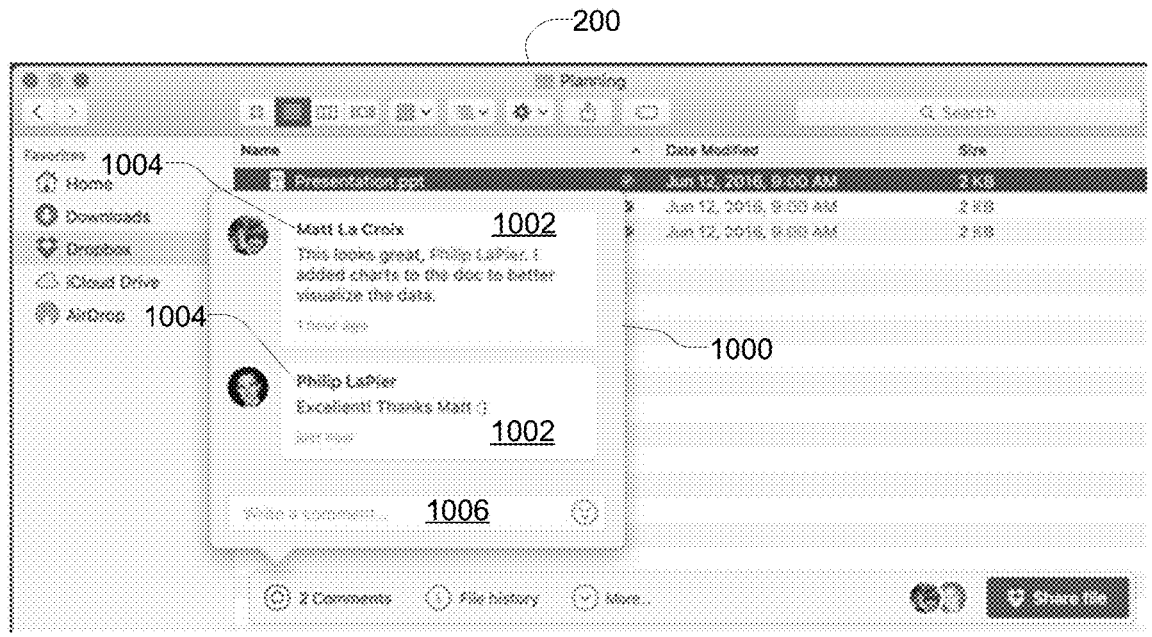
FIG. 10 is another illustration of the comment indicator.

Referring to FIG. 10, the user can focus on the comment indicator 900 by moving the cursor over it (or providing a corresponding touch gesture), in response to which the client application displays a pane 1000 in which the comments are displayed.

In response to the detecting the focus on the comment indicator 900, the client application queries the content management system for any comments on selected content item, 102 receives those comments, along with information indicating the author of each comment, and renders the comments 1002 and author information 1004 in the comment pane 1000. In one embodiment, as described below with respect to FIG. 30, in the client application comments are managed by the interaction management module 3004, which obtains the comments from an interaction data store 3214 of the content management system 2910.

The comment pane 1000 includes a field 1006 in which the user can directly enter a comment as well. Upon entry, the comment is transmitted by the client application to the content management system, which updates the comment status for the content item, and notifies by an event notification the other users that a comment has been made. The ability to comment on a content item directly in the context of the file system interface 200 eliminates the need for the user to invoke a separate email application, instant messaging application, social networking application, text messenger or the like and thereby improves useability and user workflow.

File Version Information

Figure 11:
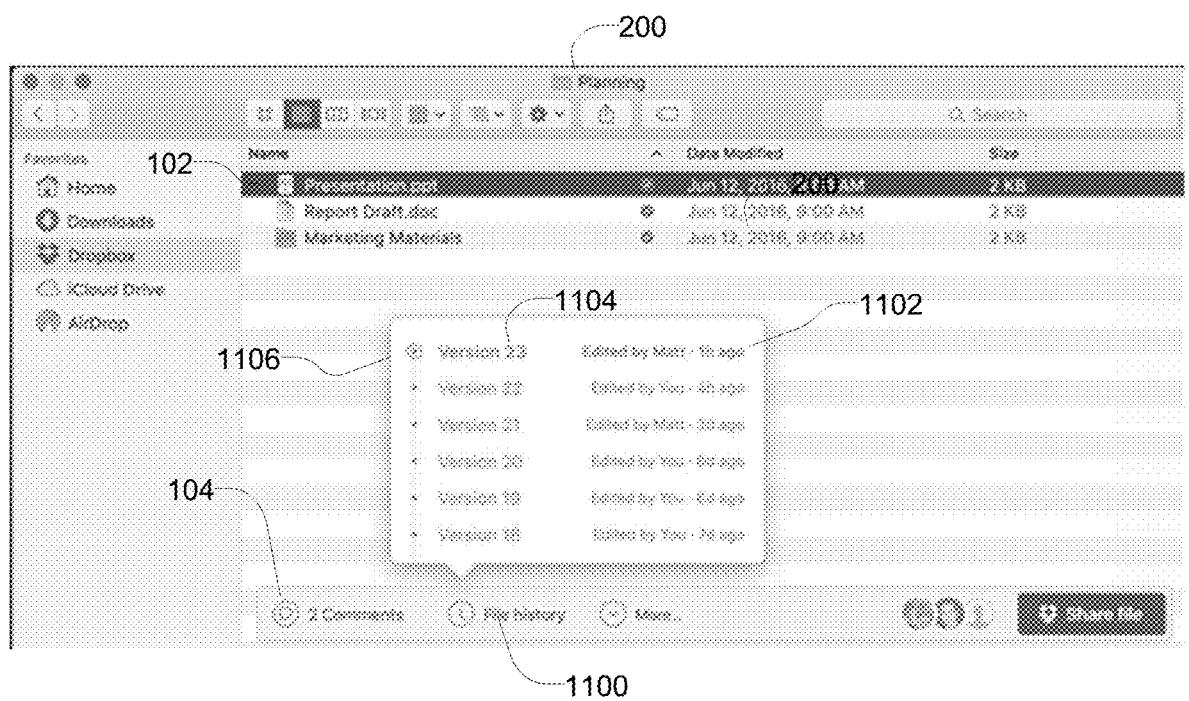
FIG. 11 is an illustration of the share bar with a file history indicator.

Referring to FIG. 11, a file history indicator 1100 provides access to file version information for the selected content item 102. In response to the user directing the cursor (or corresponding gesture) over the file history indicator 1100, version information 1102 is displayed by the client application. FIG. 11 illustrates the version information.

Here, the client application queries the content management system for the list of versions for the selected item; the list includes the version number 1104, the last user to edit the content item, and an indication of the date/time at which the last edit was made. In one embodiment, as described below with respect to FIG. 32, file version history is stored along with content item in a content storage 3220 on the content management system 2910. In the illustrated embodiment, only the last six versions are shown. The user can select any version 1106 and have it restored from the content management system to their client device.

Figure 12:
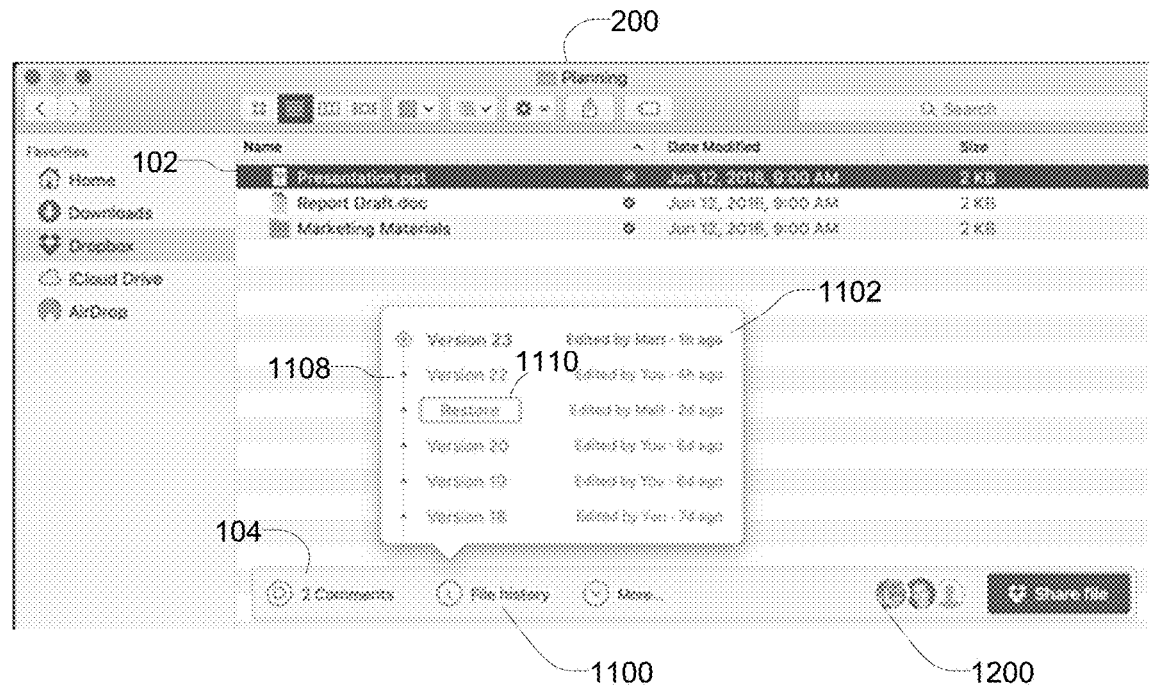
FIG. 12 is another illustration of the file history indicator.

Referring to FIG. 12, in response to detecting the user focusing the cursor on a specific version 1108, the client application changes the version number text to "Restore" 1110; if the user clicks on "Restore" 1110 then the client application sends a request to content management system indicating the path name for the item and the version number. The content management system retrieves the underlying file data for the selected version and syncs it back to the client device.

Sharing Users

The share bar can also include information indicate the other users which whom the content item is currently shared. This feature is shown in FIG. 12 as well, by an indication of the user icons 1200 for the other users. In response to detecting the user selecting the content item 102 in the file system, the client application requests from the content management system identifying information of the other users with whom the content item is shared, e.g., a user name or user ID. In one embodiment, as described below with respect to FIG. 32, the sharing user information is obtained from the interaction data store 3224 of the content management system 2910. The client application uses that information to retrieve an icon 1200 for each identified user (or obtain the icon from the content management system (e.g. a user account database 3218) or from a local contact directory (e.g., contact directory 3040). If no user specific icon 1200 is available, then the user is represented by a generic person icon 1200.

Figure 13:
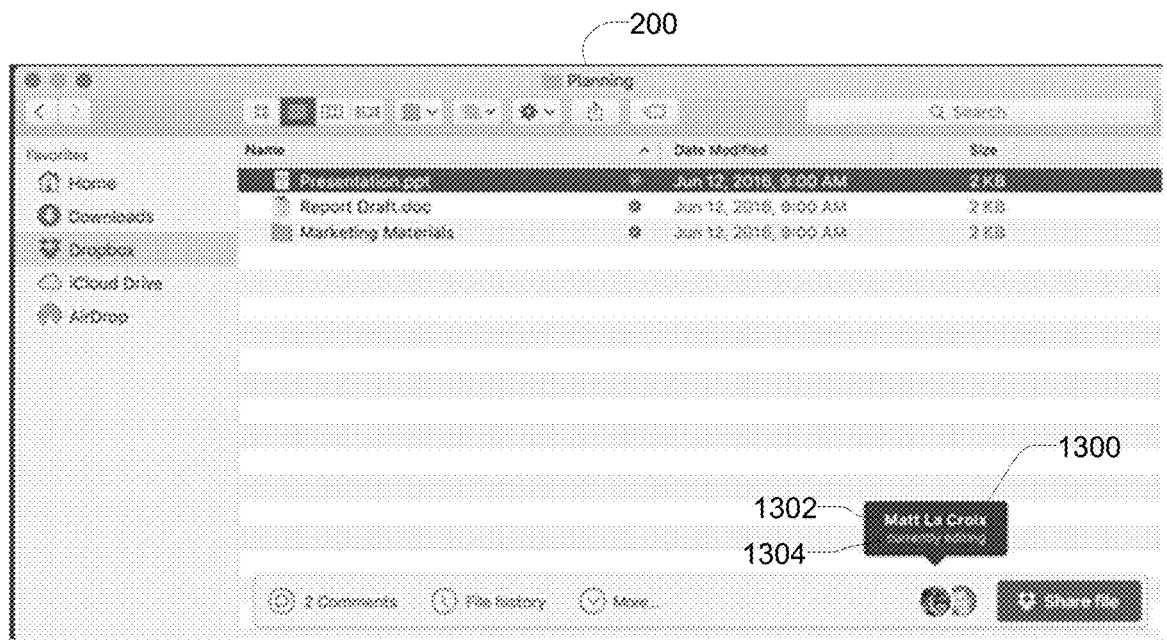
FIG. 13 is an illustration of the share bar with a status notification box indicating another user sharing a file.
Figure 14:
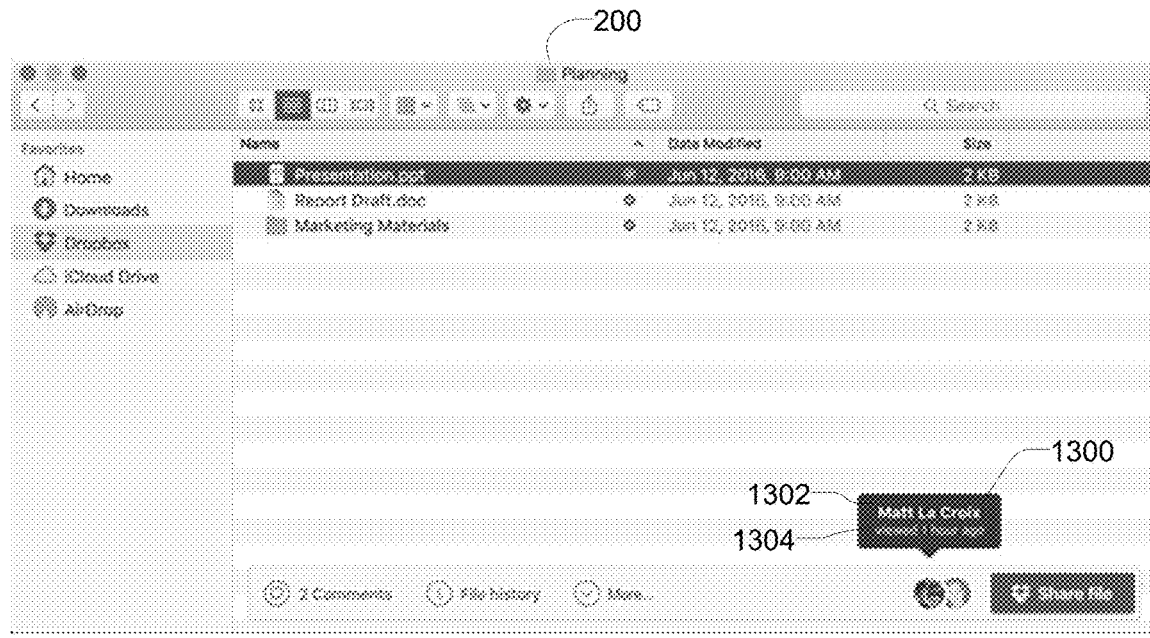
FIG. 14 is another illustration of a status notification box.

The status of other users' interaction with the selected content item may also be indicated in the share bar. Referring to FIG. 13, a status notification box 1300 ("Matt La Croix current editing") indicates that one of the other users with whom the content item is shared is currently editing the item, displaying both the name 1302 of the other user and the current status 1304 or activity. The client application obtains this information from the content management system as well (e.g., from interaction data store 3224). FIG. 14 illustrates another example of status information 1304, here the last user to access the content item.

Copy Link

Figure 15:
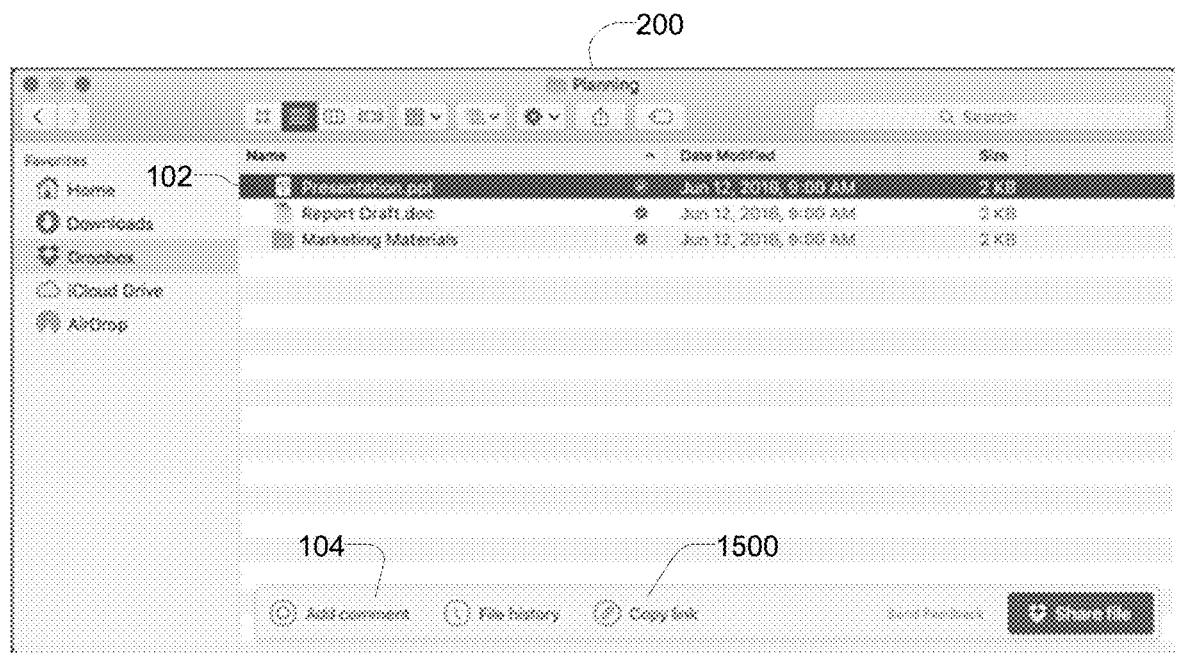
FIG. 15 is an illustration of the share bar with a copy link element.

Referring to FIG. 15, another function that can be provided in the share bar 104 is the ability to copy a link to the selected item. In one embodiment, a copy link element 1500 appears in the share bar 104 in response to the client application detecting a user selection of a content item 102 (folder or file) in the file system 200.

Here, selection of the copy link element 1500 results in the client application requesting from the content management system a link to the item 102 in the system's content storage; this link can be sent to another user via email, text messaging, included in a document, or otherwise provided. When the recipient selects the link, the content management system provides a view of the selected content item within the content storage, but without making the recipient a shared user of the folder containing the selected item; the user can download the item to their own account within the content management system. An implementation of the copy link functionality is described in U.S. Pat. No. 9,049,176, incorporated by reference herein.

Managing Access Privileges to Folders

Figure 16:
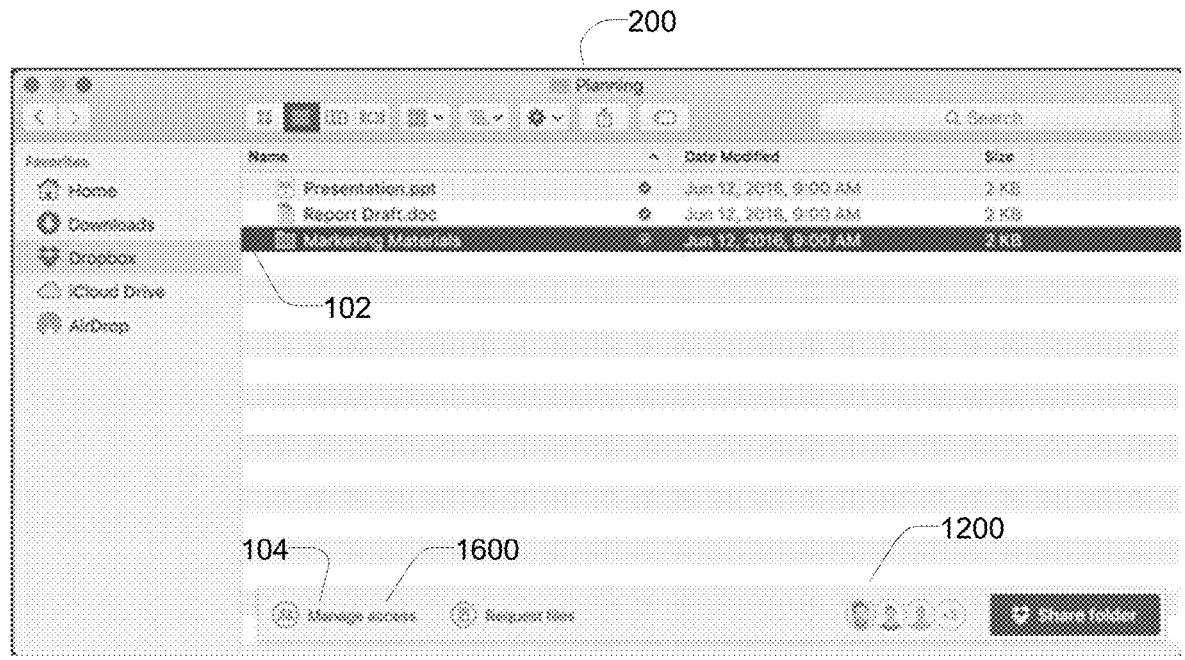
FIG. 16 is an illustration of the share bar with a manage access element.
Figure 17:
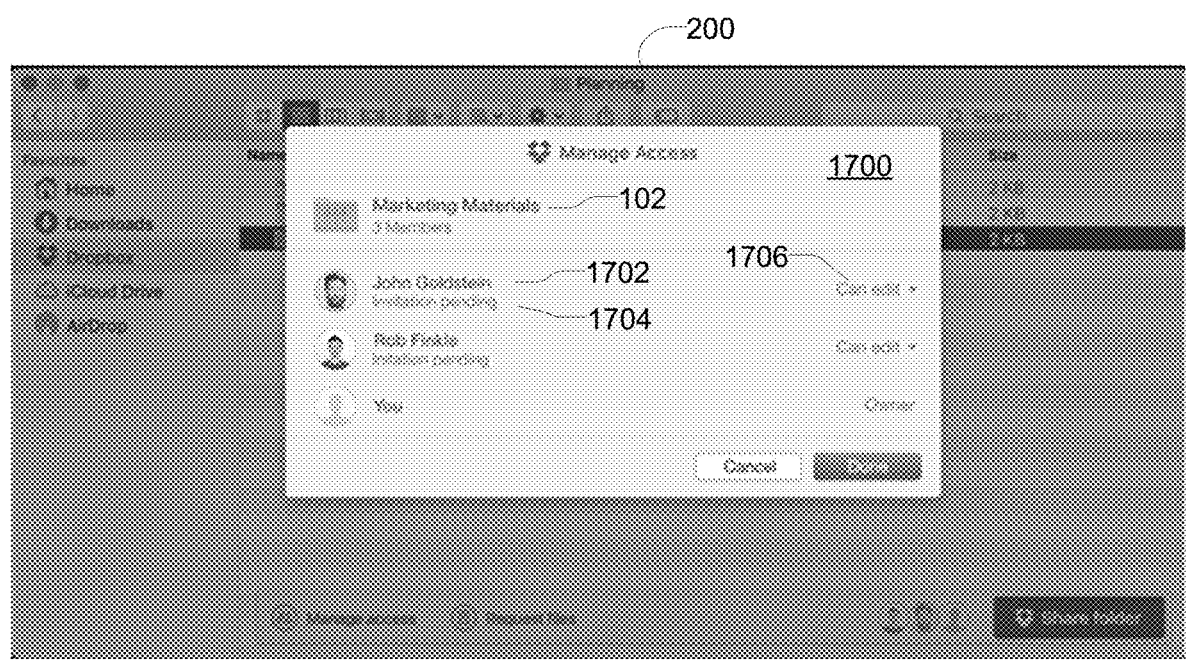
FIG. 17 is an illustration of a manage access dialog box.

Referring to FIG. 16, another functionality that may be included in the share bar 104 is a function to manage access privileges to the folder. Here, the manage access element 1600 is automatically displayed by the client application where the selected item 102 is a folder. As before, icons 1200 representing the users with whom the folder 102 is currently shared are displayed as well in the share bar 104. The user can select the manage access element 1600, and in response, the client application displays a control dialog box 1700 to set the access privileges for these other users, as illustrated in FIG. 17.

The manage access dialog box 1700 lists each of the users 1702 with whom the selected folder 102 is shared, their status 1704 ("invitation pending" for example). For each user, there is a control 1706 with selectable items defining different levels of access.

Figure 18:
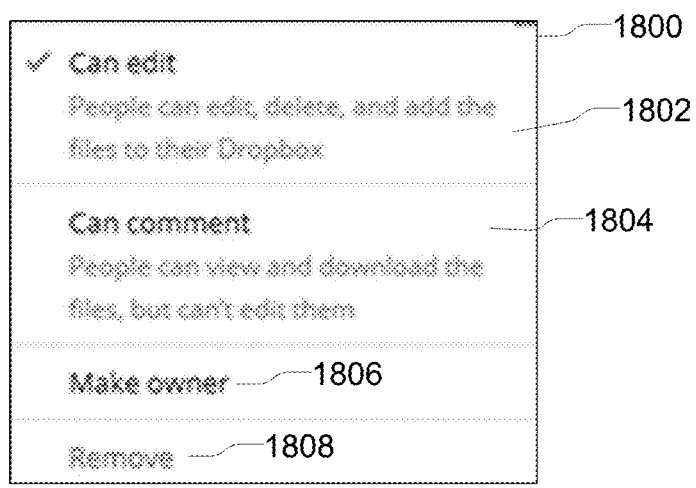
FIG. 18 is an illustration of a menu for managing access.

Referring to FIG. 18, there is shown a menu from which the user can enable another user to edit 1802 or comment 1804 on an item (or optionally view only without commenting, not shown here); the user can also make 1806 the other user the owner of the folder, or remove 1808 them from accessing the folder entirely.

File Completion Status Information

Figure 19A:
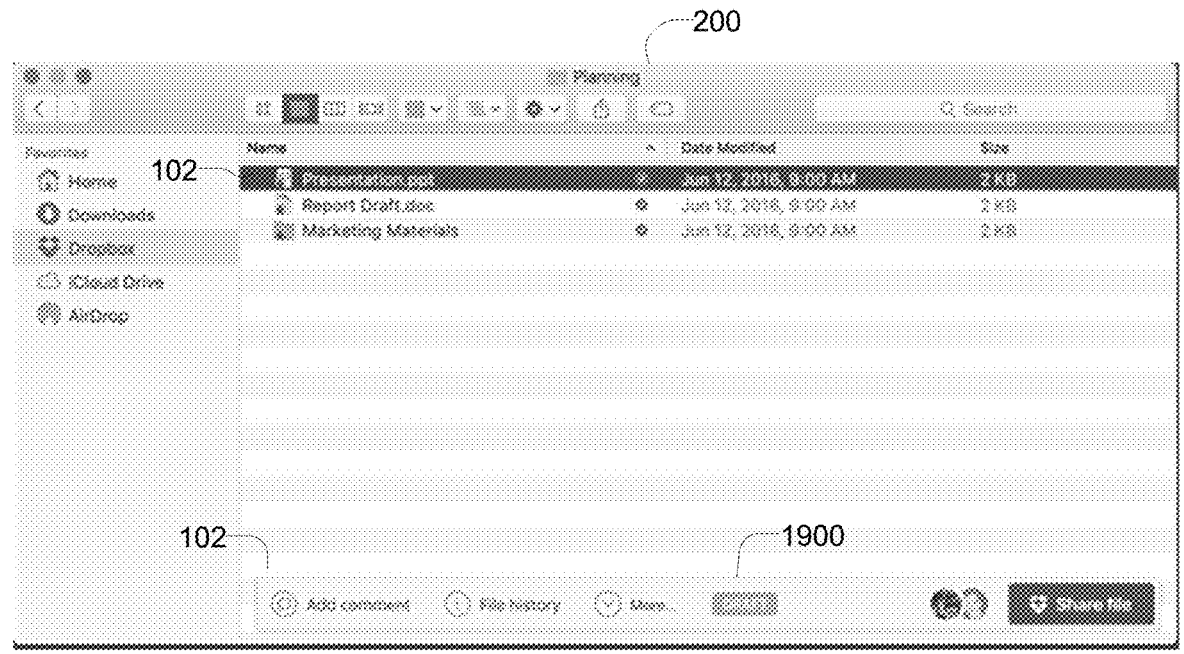
FIGS. 19A-B are illustrations of the share bar with a file completion status indicator.
Figure 19B:
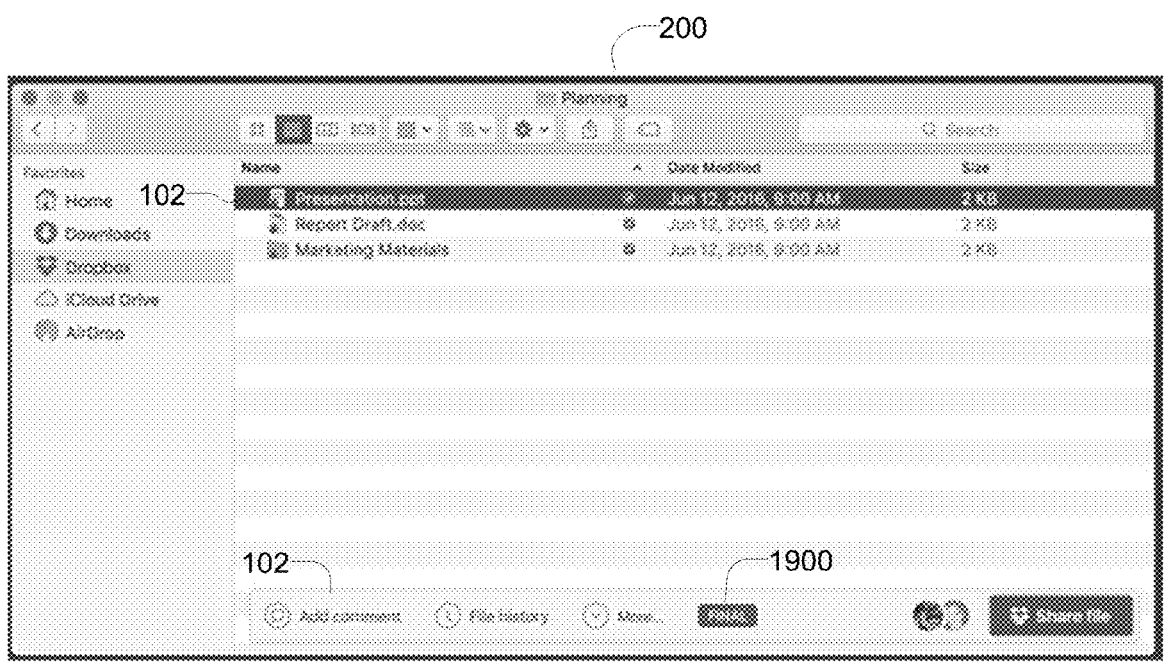

Referring to FIGS. 19A and 19B, another functionality that may be included in the share bar is a file completion status indicator 1900 of the completion status of a file type content item.

In FIG. 19A the user has selected the "Presentation.ppt" file 102. I response to the selection, the client application determines from file attributes of the selected file 102 that the file has a completion status of "DRAFT" and displays this status information in the status indicator 1900 in the share bar 104, as illustrated. The "DRAFT" status may include a draft number (e.g., "DRAFT 1," "DRAFT 2," etc.). The status information is obtained by the client application when it queries the content management system for the attributes of the selected file, as previously described.

In FIG. 19B, the completion status of the "Presentation.ppt" file is indicated status indicator 1900 as "FINAL". The indication of the completion status is distinct information from the version information or access privileges and is beneficial for the users who have access to a file. A file may have any number of versions (and multiple versions may be associated with the same draft), but the version number alone does not indicate whether a file has reached a final stage of preparation and is considered complete. Similarly, access information (which users have viewed, commented, or edited a file) does not itself provide information on the completion status. Thus, completion status information being readily available to the user without having to do more than select the file within the file system provides useful information not previously available.

Request Files for Folders

Figure 20:
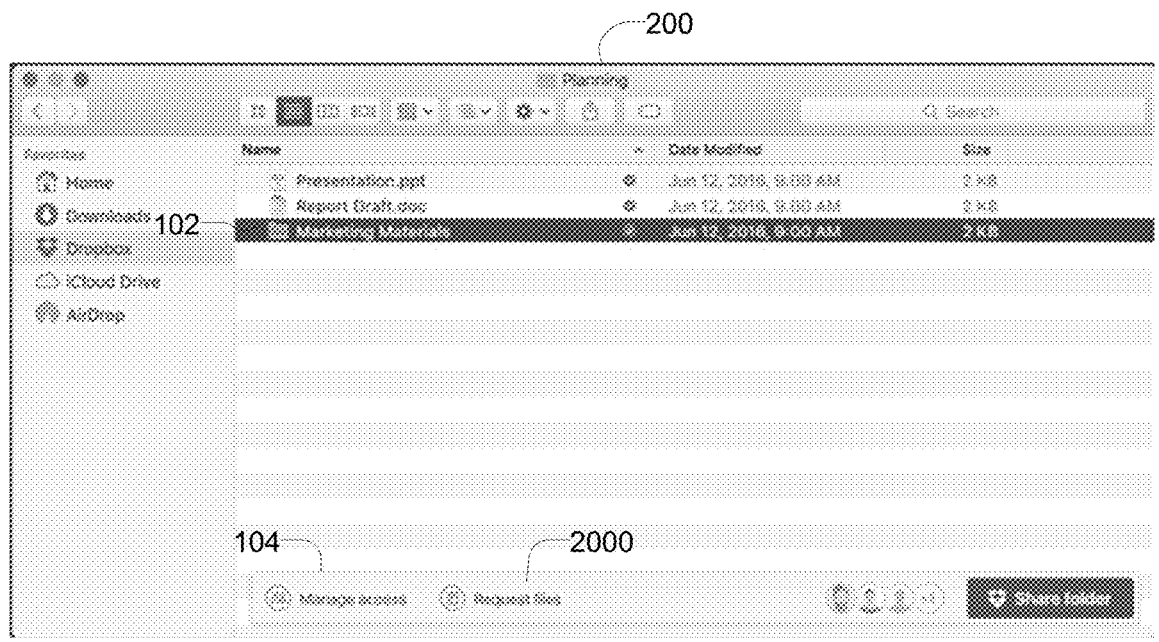
FIG. 20 is an illustration of the share bar with a control element to request files.

Referring to FIG. 20, another functionality that may be included in the share bar 104 is a function to request other users to upload files to a folder (which may be shared or not shared).

In response to the user selecting a folder 102 in the file system user interface, the client application can display in the share bar a control element 2000 to request files. Upon selection of this control element 2000, the client application displays a dialog box as illustrated in FIG. 21.

Figure 21:
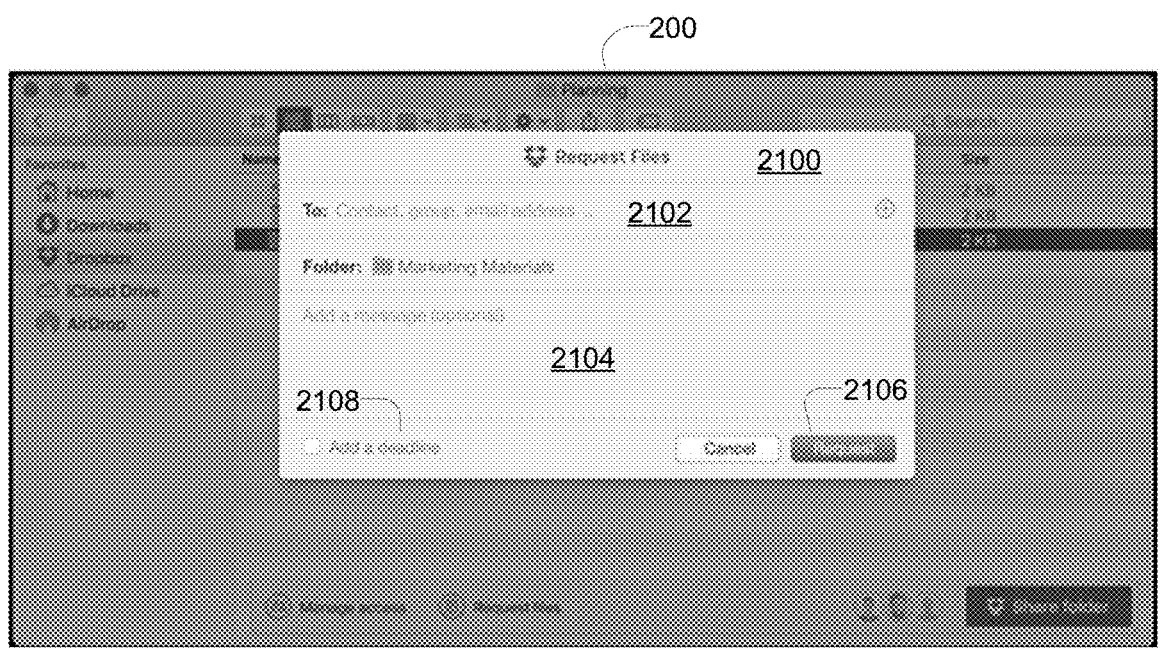
FIG. 21 is an illustration of a dialog box for requesting files.

In FIG. 21, the request files dialog 2100 includes a To field 2102 in which the user can input the names of the other users who will be requested to provide files to the currently selected folder, e.g., "Marketing Materials" in this example. The dialog 2100 includes a message field 2104 in which the user can provide additional information, such as instructions of which files are being requested. When a request is ready, the user selects the "Request" button 2106. The client application transmits the request as a message object to the content management system, which generates a message (e.g., an email, text or native message) to the indicated recipients, along with a link to the folder for uploading files. The user can optionally select the "Add a deadline" control 2108 and input a date by which the requested file must be provided; the content management system tracks the recipients of the request to confirm that they have provided at least one file by the indicated date (in one embodiment, the content management system does not determine whether the provided files are actually responsive to the request; alternatively, the content management system may perform various levels of content analysis to determine if the provided files are responsive).

Sync to Content Management System

Figure 22:
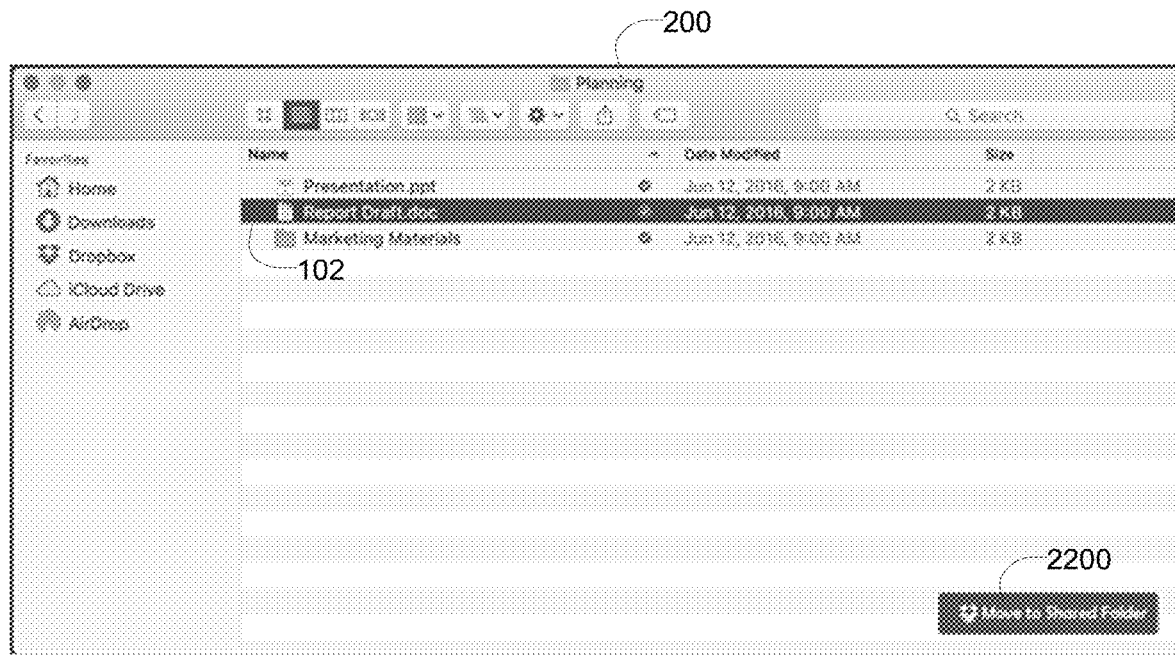
FIG. 22 is an illustration of the share bar with a control element to move a selected content item to a shared folder.

Referring to FIG. 22, in some embodiments, the client application determines whether or not the selected item is already synced to the content management system, and differentially configures the functionality of the share bar 104 accordingly. For example, where the client application determines that content item (e.g., file or folder) is already synced, it displays the corresponding share file/share folder button and related functionality icons. Where the client application determines that the selected content item is not synced, it displays a button to sync the selected item the content management system.

In FIG. 22, the user has selected the "Report Draft.doc" document 102; the client application determines that this file 102 is not synced to the content management system by querying the system with the path name of the document. The client application accordingly displays the control element 2200 to sync the file to the content management system; here that control element 2200 is labeled "Move to Shared Folder". Upon selection of the control element 2200, the client application moves the selected content item to the root directory of the user's shared folders on the client device; once in this root directory, the selected file will be uploaded to the content management system as part of the client application's content syncing cycle.

Move to Mobile Device

Figure 23:
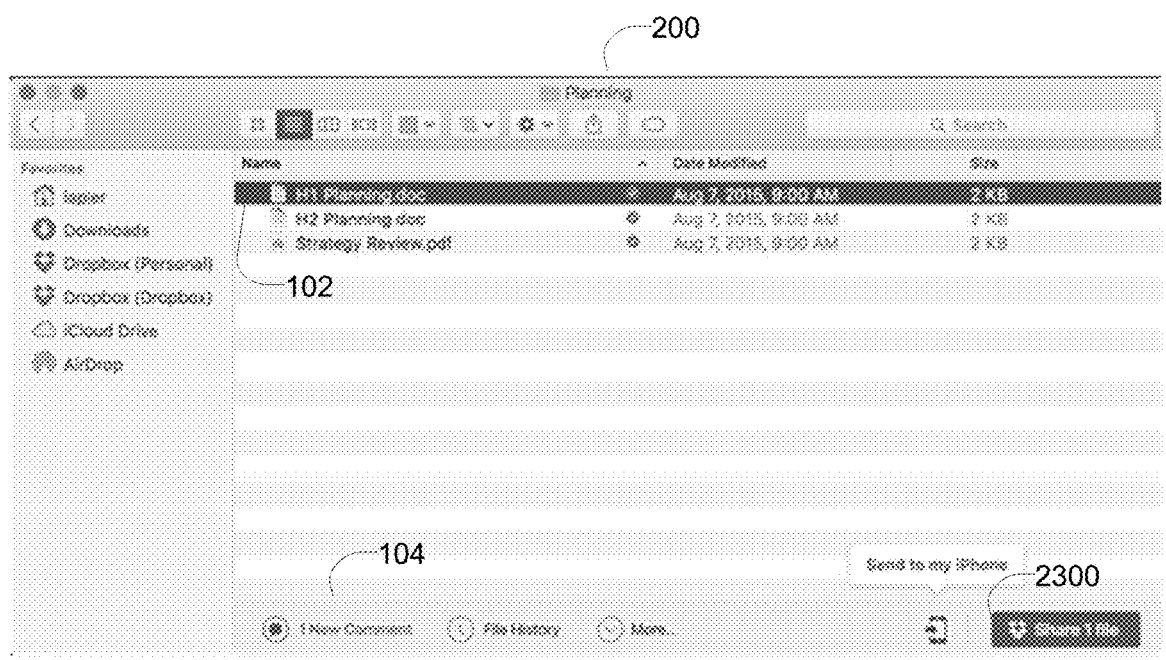
FIG. 23 is an illustration of the share bar with a control element to download a selected content item to a mobile device.

Referring to FIG. 23, another functionality that may be included in the share bar 104 is a function to download an instance of a selected content item to a designated device, such as a mobile device associated with the user's account in the content management system.

In FIG. 23, the share bar 104 includes a control element 2300 (e.g., an icon of a mobile phone). In response to selection of the control element 2300, the client application sends the content management system a message identifying the selected file 102, and a request to download the selected file 102 to the mobile device. The content management system determines from the user's account the device addressing information and transmits a corresponding client application on the mobile device a notification that the selected file is available for downloading, including a pathname and file identifier. The client application on the mobile device requests the file to be downloaded using a callback function.

Alternative Presentations of the Share Bar

Figure 24A:
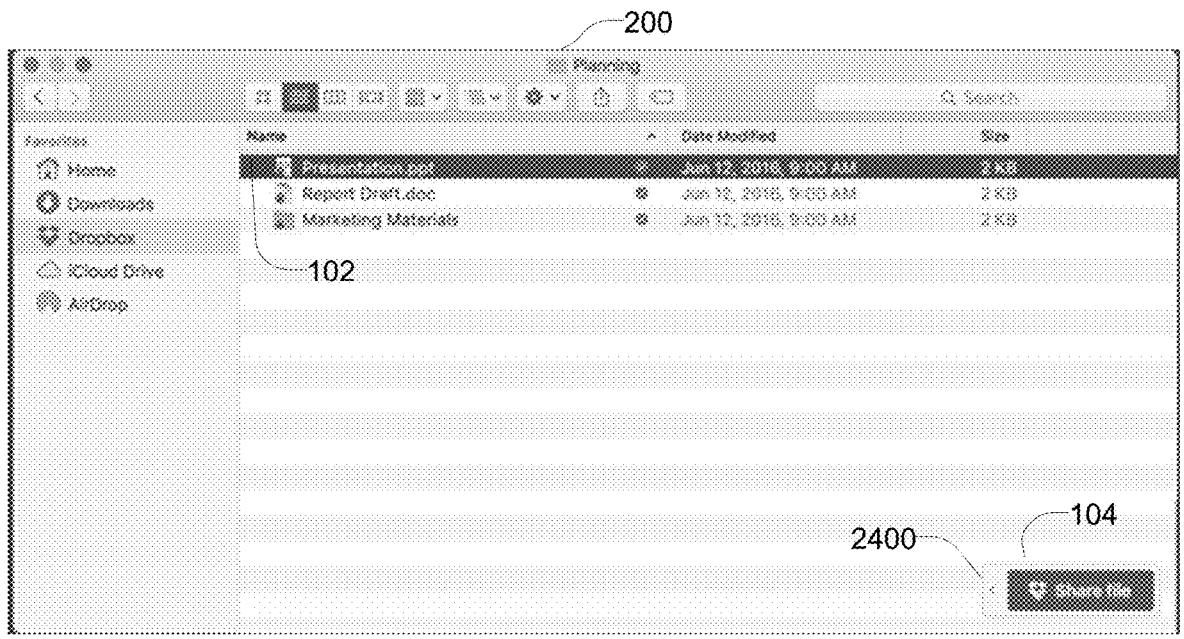
FIGS. 24A-B are illustrations of the share bar in minimized and maximized states.
Figure 24B:
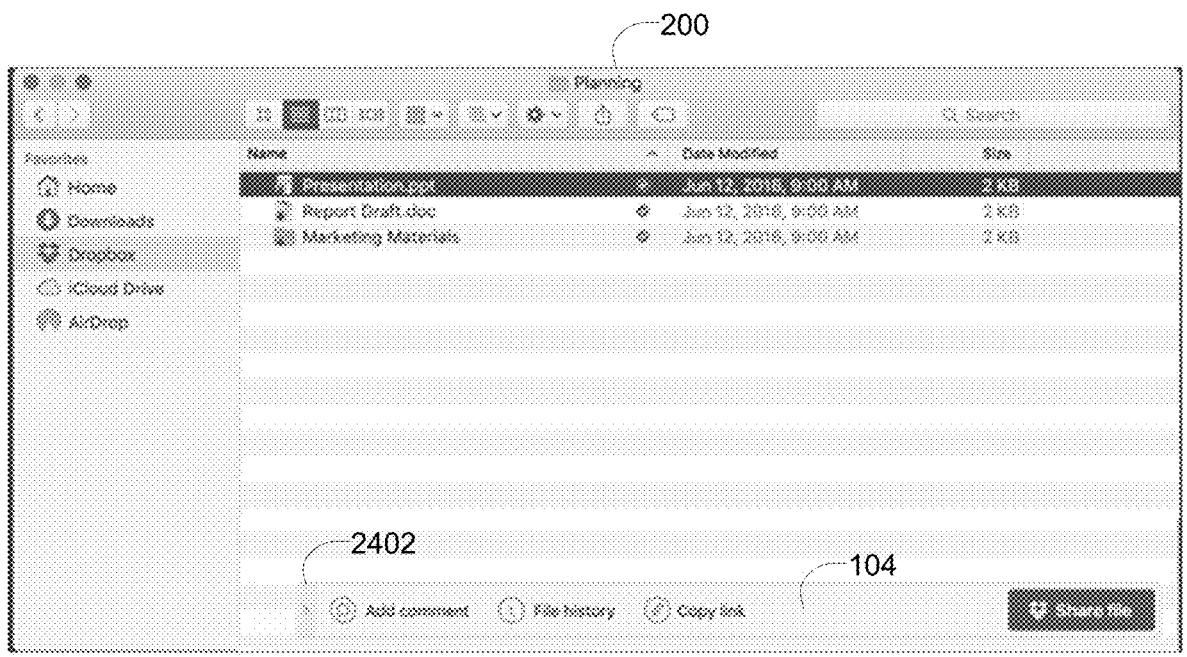

Referring to FIGS. 24A-24B, the share bar 104 can be displayed in various presentation modes, depending on default configuration settings for the client device. In one embodiment illustrated in FIG. 24A, the share bar 104 is initially presented in a minimized state.

In response to the selection of the content item 102, the client application automatically displays the share bar in minimized state, showing only share button, and maximize button 2400 indicating the bar can be expanded. The bar 104 remains in the minimized state until the user explicitly clicks on the maximize button 2400. In response, the client application displays the share bar 104 at full size as illustrated in FIG. 24B.

Here, the client application now displays the share bar 104 in its maximized (or expanded) size. In addition, the maximize icon is replaced with a minimize icon 2402 in response to selection of the minimized icon 2402, the share bar is displayed in its minimized state.

More Menu

Figure 25:
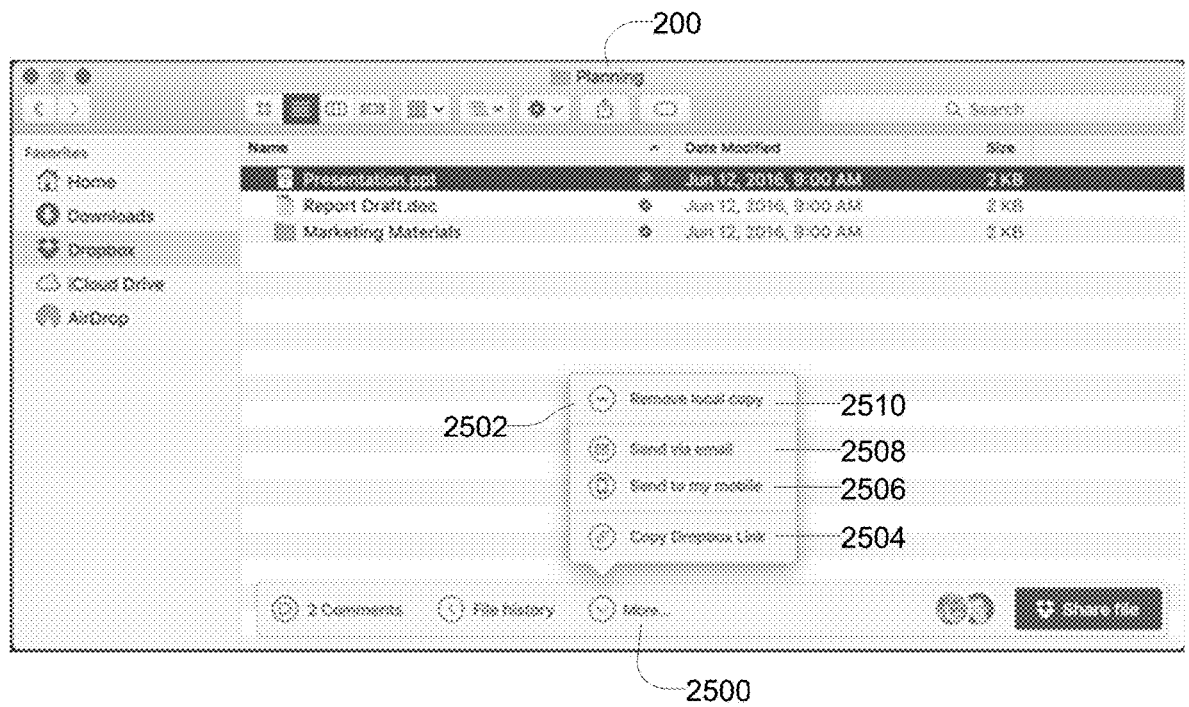
FIG. 25 is an illustration of the share bar with a menu control element.

Referring to FIG. 25, in another embodiment, multiple different functionalities can be included within an accessible menu in the share bar 104, activated by a menu control element 2500 labeled "More . . . ".

In response to the user hovering (focusing) the cursor over the More . . . control 2500 element, the client application displays a menu 2502 overlaid on the file browser 200. The menu 2502 provides access to additional functions, such as those previously described (copy link 2504, send to mobile device 2506) as well as other functions, for example, a remove local copy function 2510 to remove the selected item from the user's shared content directory, and send via email function 2508. The latter function invokes a local email client on the client device and attaches the selected content item as a file attachment. The user can then address the email and send the copy to the desired recipient.

New Shared Folder

Figure 26:
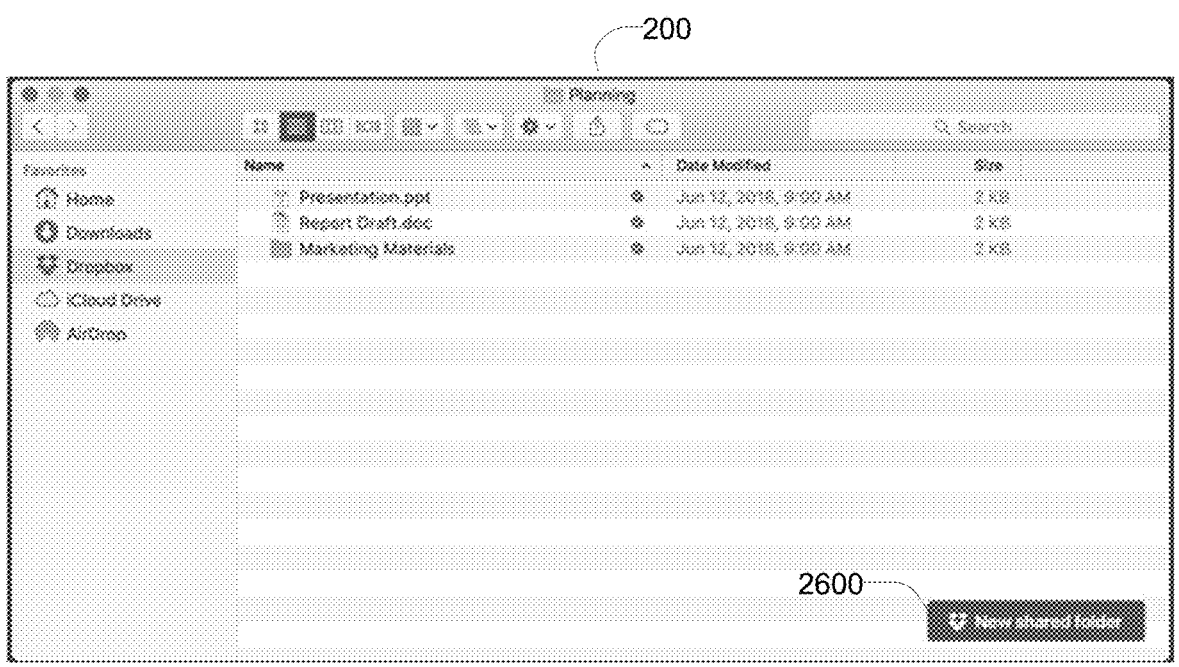
FIG. 26 is an illustration of the share bar with a control element to create a new shared folder.

Referring to FIG. 26, even when a file system window 200 has the current focus, the user may not have selected any content item listed therein. In one embodiment, in that case, the client application displays a different button 2600 in the share bar, associated with a function to create a new shared folder.

Here, the client application has overlaid a New shared folder button 2600 on the file system browser window 200. In response to a selection of this button 2600, the client application creates a new folder in the current directory and invokes the share sheet (FIG. 4) to enable the user to select one or more recipients with whom to share the folder.

In the foregoing discussion, the file system interface 200 has been illustrated in list mode, showing the content items 102 presented in the form of a list, with the share bar 104 presented therewith. The share bar 104 and the additional functionality associated with it as described above is operative in the file system interface 200 independently of the manner in which the content items 102 are presented, and thus is available when the file system interface, 200 operates in icon mode, column mode, or "cover flow" mode, or other presentation modes.

Further, in the foregoing embodiments the functionality of the share bar 104 is provided by a client application associated with the content management system; in other embodiments, the functionality of the share bar is provided by the native operating system software for the file system interface itself, or alternatively by "plug-in" code modules can extend the functionality of the native file system interface.

Implementation Design

The sharing client application is an instance of the client application 3000 shown in FIG. 30 below, and including inter alia, an interaction management module 3004, as described.

The interaction management module 3004 registers to receive event notifications from the file system browser window 200, for any events occurring at or below the root of the shared content directory (alternatively the client application 3000 can register for events in other directories as well, including the root of the file system). In an embodiment of the sharing client application 3000 for the Mac OSX by Apple Inc., the interaction management module 3004 may use the Accessibility API to obtain the event notifications. These event notifications include the currently focused application window, the currently focused or selected element within the window.

The client application 3000 also registers for events that pertain to the geometry of the graphical layout of the windows in the file system browser interface, including any movement of the file system window or change in size (height and width of the window itself, and individual subareas) of the file system window. This information is used by the client application 3000 to determine where on the screen to display the share bar 104 so that it correctly overlays the file system window 200. In other words, if the user moves and/or resizes the file system window 200, this will change the origin and/or the bounding box of the window; as a result, the client application 3000 will appropriately resize (if necessary) and move the sharing bar 104 so that it maintains its relative overlay position. To obtain the graphical layout information, the client application 3000 can receive event notifications from a graphics API of the operating system that manages user interface windows at the graphical layer, for example, the Core Graphics API in the Mac OSX.

In one embodiment, the client application 3000 performs the following sequence of operations to generate the share bar 104.

The client application obtains an event from the file system interface window 200. The client application 3000 determines if there are one or more currently focused and selected elements in the file system interface window 200, including both file and folder objects 102 listed in the file system interface, as well as graphical elements in the share bar 104 (if present).

For the focused or selected content item objects 102, the client application 3000 obtains the pathnames for these objects, which may be URLs into the file system directory (e.g., for example, in the Mac OSX, the pathname is returned as a NSURL object). The client application 3000 attempts to resolve this file pathname to a corresponding pathname by passing the pathname to the synchronization module 3212 of the content management system 2910 (FIG. 32). If the content item is contained within the content storage 3220 of the content management system 2510, the synchronization module 3212 returns a pathname to the content item therein, e.g., providing the name space of the user as the root, and the relative path within that name space. The synchronization module 3212 may also obtain and return the associated file version information, comments, shared users, completion status, as appropriate for the various control element that may be available in the share bar.

Based on the type (file or folder) and number (n) of content items selected, the client application 3000 generates the appropriate label text for the share button 104: "Share file", "Share <n> files", "Share folder", "Share <n> folders".

The control and information elements that are to be included in the share bar 104 depend on both the type of content item 102 (file or folder) and whether that item has been previously shared or not with other users, since some control elements are applicable only to files or folders, and some elements are appropriate only for shared items.

In one embodiment, if the content item 102 is a file, the following control elements are available to be included in the share bar in addition to the share button: Comments 900, File History 1100, Copy Link 1500. Additional information elements optionally include access privileges 1800 (View Only, Comment, Edit), completion status 1900 (Draft or Final). Accordingly, the client application 3000 queries the content management system 2910 to obtain the corresponding data (file versions, comments from the appropriate store (content storage 3218, interaction data store 3224).

If the file has been previously shared, the client application 3000 further obtains from the content management system 2910 the information identifying the other sharing users, including their user icons and user names, as well as recent activity (edited, commented, accessed) with respect to the file.

If the content item 102 is a folder, then the control elements available for the sharing bar 104 likewise depends on whether the folder has already been shared with other users or not. If the folder has already been shared with other users, then the control elements are: Manage Access 1700, Copy Link 1500, along with the User Icons 1200. If the folder has not been shared, then there is no need for these control elements, since there are no other users for whom access can be managed, nor is there an existing link to share.

In one embodiment, the Quick Share control element 800 (FIG. 8) can be enabled or disabled by a preference setting in the client application 3000. If Quick Share 800 is enabled, then the client application 3000 determines a set of other users to be listed in the share bar 104, as described above; the client application 3000 may obtain the user name and user icons from the user account database 3218.

If no folder or file content item 102 is presently selected, the client application 3000 selects the new shared folder button 2600 (FIG. 26) for inclusion in the share bar 104.

If the currently selected content item 102 in the file system window 200 is outside of the user's shared content directory, then the client application 3000 selects the Move to Shared Folder.

The client application 3000 determines the location of the share bar 104 for displaying as an overlay on the file system user interface 200, as well as its display state (minimized or maximized).

Once the appropriate control and information elements have been determined, along with display state (minimized or maximized), the client application 3010 can then render the share bar 104 as an overlay to the file system window 200.

In one embodiment, whether the share bar 104 is displayed in maximized or minimized size depends on the scroll state of the underlying file system interface window 200. As described above, the share bar 104 is displayed as an overlay to the file system window 200; this means when there are enough items in the current directory to fill the window to its bottom edge, the share bar 104 would be displayed in front of one or more items, thereby obscuring them from the user's view.

Figure 27:
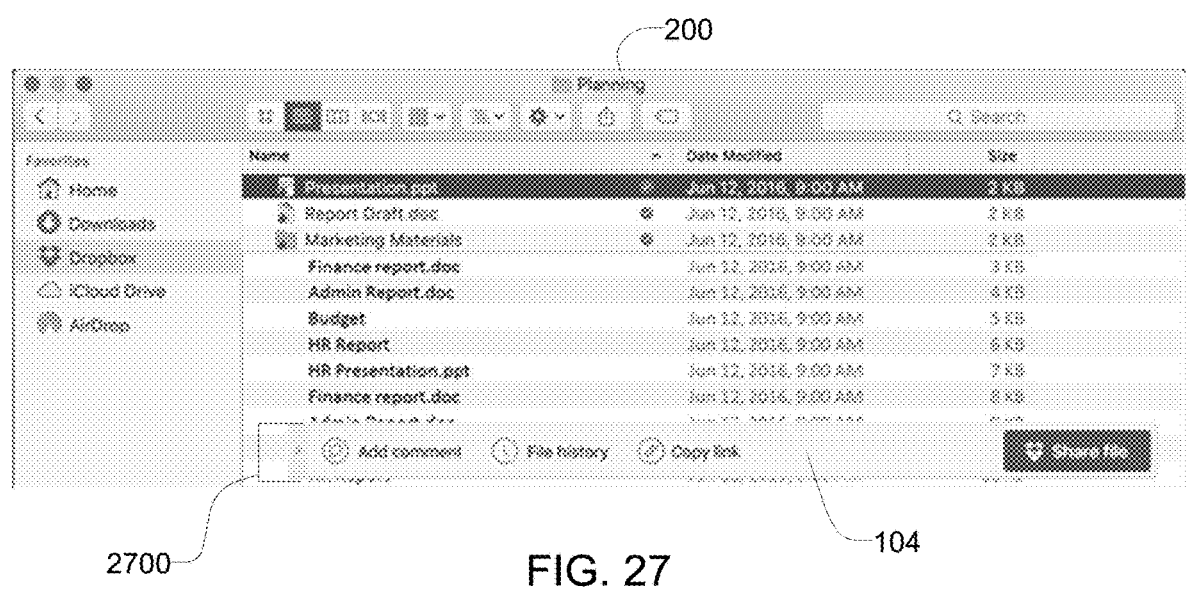
FIG. 27 is an illustration of the share bar overlaid on the file system user interface window.

Referring to FIG. 27 as an example, the share bar 104 is overlaid in front of three items in the bottom three rows 2700 of the file system user interface 200. Since these items are the very last items in the content directory, the user cannot scroll the window to reveal them; instead, the user would have to manually minimize the share bar 104 to reveal them. (If the obscured items are not those at very bottom, user can simply scroll the window to display them).

To avoid this outcome, the client application makes use of additional graphical layout information to determine whether share bar will overlay the last content items in the window if displayed in its maximized form. If, so then the client application instead displays the share bar in minimized form.

Figure 28:
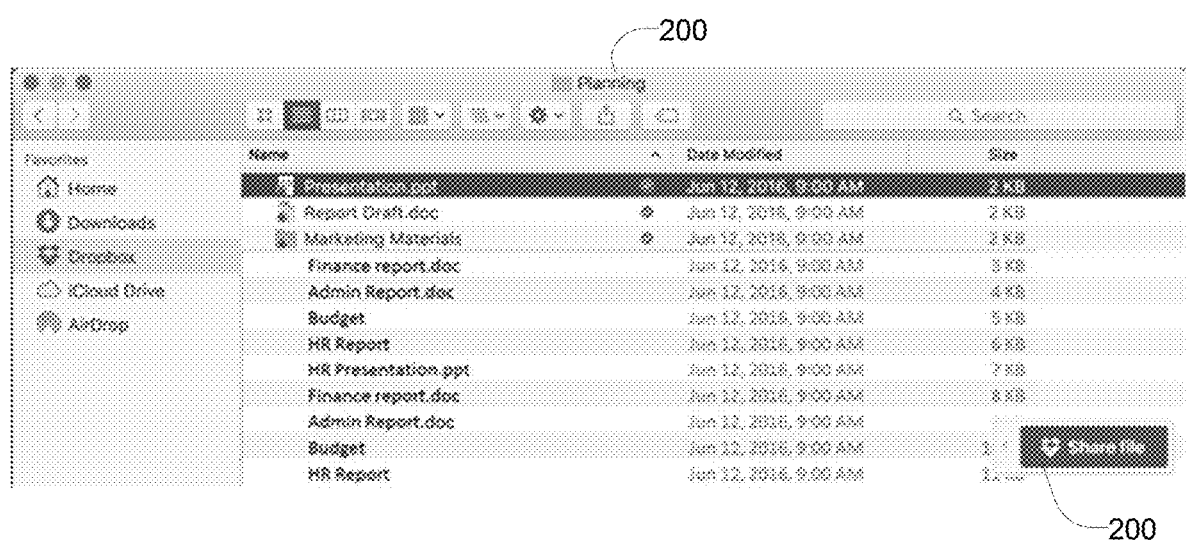
FIG. 28 is an illustration of the share bar overlaid on the file system user interface window in minimized form.

FIG. 28 illustrates this solution. Here, the share bar 104 is still overlaid in front of the file system window 200, but shown in minimized form to avoid obscuring the names of the last three content items at the bottom of the window 200.

To make this determination, the client application 3000 uses information about the layout of the file system window 200. The client application knows the height of the share bar 104 in pixels (N), as well as the number of pixels from the bottom edge of the window by which the share bar 104 is offset (O). The client application 3000 determines whether the bottom edge of the share bar 104 would be rendered at or below the bottom (N+O) pixels of the file system window 200. If so, then the share bar 104 is shown in minimized form.

One way to make this determination is to multiply the (1-scroll percentage) by the full height of the scrolling region, and compare this value to (N+O); if the result is greater than (N+O), this indicates that the bottom (N+O) pixels of the file system window are not in view, and thus the share bar 104 can be displayed maximized. If the result is equal to or less than (N+O), then the share bar 104 is shown in minimized form. The scroll percentage is a measure of how far the user has scrolled through the scrolling region (the area of the screen containing the content items).

FIGS. 29-36 are illustrations of an embodiment of a content management system and associated client application on a client device for synchronizing content items.

Figure 29:
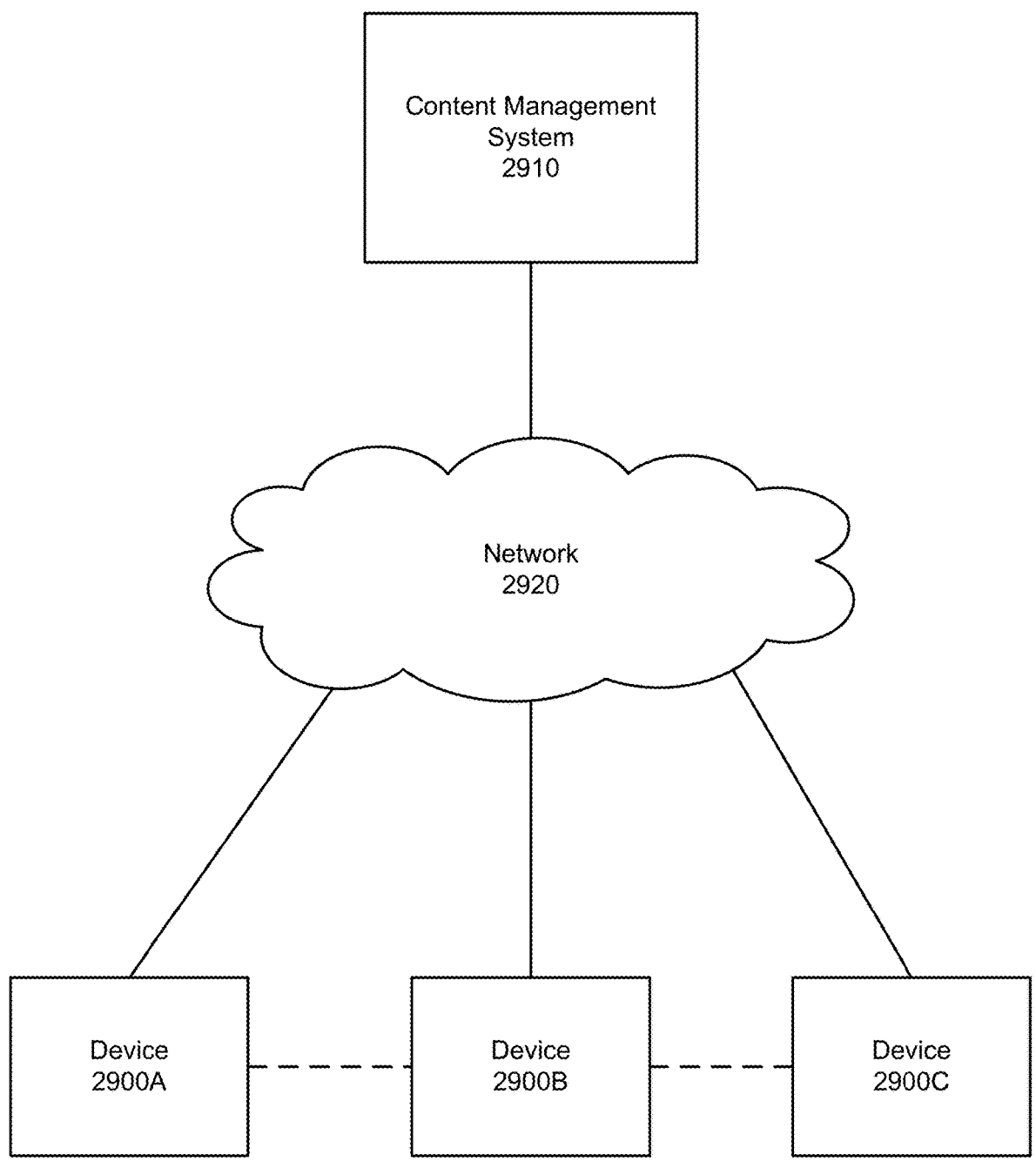
FIG. 29 is an illustration of an embodiment of an environment for content item synchronization including communication of interaction information and user collaboration.

FIG. 29 shows an embodiment of an environment for content item synchronization. FIG. 29 includes devices 2900A, 2900B, 2900C (referred to generally as device 2900), content management system 2910, and network 120. Three devices are shown only for the purpose of illustration; in practice, any number of devices may be present in the environment. Similarly, other modules or components described and illustrated throughout may include single or multiple instances as appropriate to the needs of the implementer and without loss of generality.

Device 2900 may be any suitable computing device for locally storing and viewing content items and synchronizing the content items with content management system 2910. Examples of devices include desktop and laptop computers, hand-held mobile devices, tablet computers, and other computing devices. The operation of device 2900 in various embodiments is further described below.

Each device 2900 communicates with content management system 2910 through network 120. Network 120 is any suitable network and may include local networks, corporate networks, global networks, and any combination of these. In typical configurations, devices 2900 communicate via a wired or wireless communication network to a local network service provider and communicate with content management system 2910 through the Internet. In certain configurations, devices 2900A, 2900B, and 2900C communicate directly with one another without network 120 as indicated in FIG. 1 by dashed lines. For example, devices 2900 may communicate via a wired or wireless connection, such as wirelessly via a Bluetooth connection or a wired connection via a Universal Serial Bus (USB).

Content management system 2910 provides content sharing and synchronization services for users of devices 2900. These services allow users to share content with users of other devices 2900. In addition to content sharing, content management system 2910 updates shared content responsive to changes and enables synchronized changes to content items across multiple devices 2900. A user may synchronize content across multiple devices 2900 owned by the user and associated with the user's account, and the user may share content that is synchronized with devices associated with other users' accounts. Content stored by content management system 2910 can include any type of data, such as digital data, documents, media (e.g., images, photos, videos, audio, streaming content), data files and databases, source and object code, recordings, and any other type of data or file, collectively referred to here as "content items." Content items stored by content management system 2910 may also be used to organize other content items, such as folders, tables, collections, albums, playlists, or in other database structures (e.g., object oriented, key/value, etc.). In practice, various devices 2900 may be synchronizing different groups of content items, based on user associations, permissions, content sharing permissions, and so forth. The operation of content management system 2910 in various embodiments is further described below with respect to FIG. 4.

Figure 30:
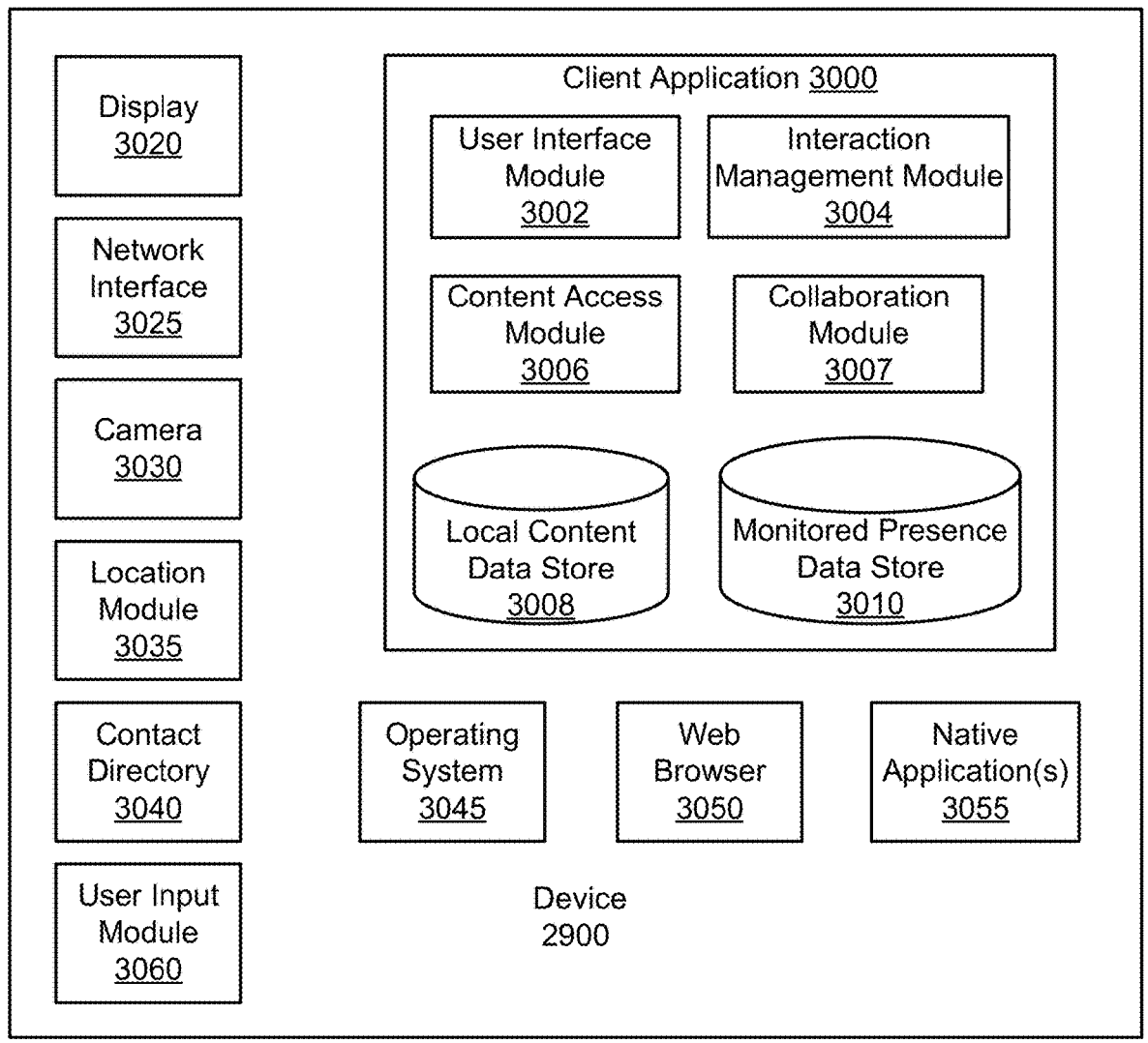
FIG. 30 shows various modules and components of a device in accordance with one embodiment.

FIG. 30 shows various modules and components of device 2900 in accordance with one embodiment. Device 2900 includes display 3020 for providing information to the user, and in certain client devices 2900 includes a touchscreen. Device 2900 also includes network interface 3025 for communicating with content management system 2910 via network 120. Device 2900 also includes a user input module 3060, which receives user inputs from various user input devices, such as a keyboard, a mouse, a trackpad, or other device. Other conventional components of a client device 2900 that are not material are not shown, for example, one or more computer processors, local fixed memory (RAM and ROM), as well as optionally removable memory (e.g., SD-card), power sources, and audio-video outputs.

Software modules include operating system 3045 and one or more native applications 3055. Native applications 3055 vary based on the client device, and may include various applications for creating, viewing, consuming, and modifying content stored on content management system 2910, such as word processors, spreadsheets, database management systems, code editors, image and video editors, e-book readers, audio and video players, and the like. Operating system 3045 on each device provides a local file management system and executes the various software modules such as content management system client application 200 and native application 3055. A contact directory 3040 stores information about the user's contacts, such as name, picture, telephone numbers, company, email addresses, physical address, website URLs, and the like. Further operation of native applications 3055, operating system 3045, and content management system client application 200 are described below.

In certain embodiments, device 2900 includes additional components such as camera 3030 and location module 3035. Camera 3030 may be used to capture images or video for upload to the online content management system 2910. Location module 3035 determines the location of device 2900, using, for example, a global positioning satellite signal, cellular tower triangulation, or other methods. Location module 3035 may be used by client application 200 to obtain location data and add the location data to metadata about a content item, such as an image captured by camera 3030.

Client device 2900 accesses content management system 2910 in a variety of ways. Client application 200 can be a dedicated application or module that provides access to the services of content management system 2910, providing both user access to shared files through a user interface, as well as programmatic access for other applications. Client device 2900 may also access content management system 2910 through web browser 3050. As an alternative, client application 200 may integrate access to content management system 2910 with the local file management system provided by operating system 3045. When access to content management system 2910 is integrated into the local file management system, a file organization scheme maintained at content management system 2910 is represented as a local file structure by operating system 3045 in conjunction with client application 200. Client application 200 may take various forms, such as a stand-alone application, an application plug-in, or a browser extension. Client application 200 includes user interface module 3002, interaction management module 3004, content access module 3006, local content data store 3008, monitored presence data store 3010, and collaboration module 3007.

In addition to handling other device tasks, operating system 3045 displays information from applications executing on device 2900 to a user via display 3020, which may include one or more user interface elements. Such user interface elements may vary based on the particular device and configuration. User interface elements include windows on a desktop interface as well as interface elements on a mobile device. Examples of operating systems that employ user interface elements such as windows are Microsoft Windows 10 by Microsoft Corporation of Redmond, Wash., and OS X by Apple Inc. of Cupertino, Calif. In addition, operating system 3045 manages control of multiple native applications 3055, which may be executing simultaneously. The user interface elements may be layered, such that one layer overlaps another layer. In some operating systems and configurations, only a single user interface element is displayed at a given time. One user interface element is typically the active user interface element, meaning that it is the user interface element to which the operating system 3045 routes user inputs, such as keyboard entry, cursor movement, touch sensors, touch gestures, and so forth. As understood by those of skill in the art, a window or other user interface element that is active at a particular time is often said to have focus. Users may select another user interface element to change the focus from one user interface element to another, and in some instances operating system 3045 may change the focus without user input.

Typically, the user interface elements, e.g., windows, associated with native applications 3055 are managed by operating system 3045, which maintains an association between process identifiers of executing native applications 3055 and user interface element identifiers of the user interface elements. For example, a particular application may be associated with process id "2587", which may be managing multiple user interface elements, with user interface element identifiers 4, 8, and 10. Each user interface element identifier may be separately associated with a particular content item opened by that native application 3055, and multiple user interface element identifiers and process identifiers may be associated with the same content item.

Operating system 3045 also handles and recognizes various events. Such events include a request from native applications 3055 to close or open a content item, a request from native applications 3055 to close a window or other user interface element, and requests to change a user interface element focus, among many others. As described below, these events may be used by interaction management module 3004 to recognize a change in presence related to a content item.

Client application 200 identifies interactions that take place with respect to a content item, such as when a user opens, closes, edits, or saves the content item on the device. These interactions are identified by client application 200 to generate interaction information describing the interaction with the content item. Interaction information includes interactions with client application 200 and interactions with native application 3055. Interaction information determined from actions performed within native applications 3055 is termed presence information. An application, such as client application 200 that determines interaction information and presence information is termed a presence application. Additional types of interaction information (in addition to presence information) include notes, messages, and notification requests related to the content item, which may be received by client application 200. Messages may include chat messages to other devices, messages indicating a user's intent to interact with (e.g., to edit) a content item, and messages indicating a user's intent to begin a collaboration session. Notification requests may include a request to be notified when another user's interaction information changes. Interaction information also includes metadata modifications, such as versioning notes, event timestamps, or requests for further information stored at content management system 2910 about the content item, such as a request to view versioning information or prior content item versions. Further examples of interaction information are described below. Client application 200 may receive chat or intent information from a user. In various embodiments, device 2900 identifies a user's presence in a content item (i.e. that the user has the content item open or is editing the content item using the native application 3055) through interaction with operating system 3045 as described further below. Interaction information is transmitted to other devices 2900 that are synchronized with respect to the content item.

Device 2900 receives content items from content management system 2910 and permits users to view, modify, and interact with the content items using various native applications 3055 stored on the device 2900. For example, device 2900 may include a photo editing application that manipulates image content items, a word processing application that permits modification of text content items, or a computer-aided design (CAD) application that permits modification of drawing content items. As described further below, interaction information is determined by device 2900 via user interactions applications and the interaction information is sent to other devices 2900. In addition, when device 2900 receives interaction information relating to other devices 2900, the device 2900 displays that interaction information.

In one embodiment, an application detecting interaction information relating to content items is distinct from the applications viewing or manipulating the content items. For example, the client application detecting interaction information is distinct from a photo editing application manipulating or displaying the image content items. In various embodiments, the application detecting interaction information is also responsible for synchronizing the content items with content management system 2910. Since the application detecting presence information may be distinct from the applications about which presence is detected, presence may be monitored for many applications and content items at once and without requiring integration of the presence monitoring into each type of content item viewer. That is, no special presence monitoring add-on or application modification is required, for example, for each of a photo editing application, a word processing application, and a playlist editing application.

Figure 31A:
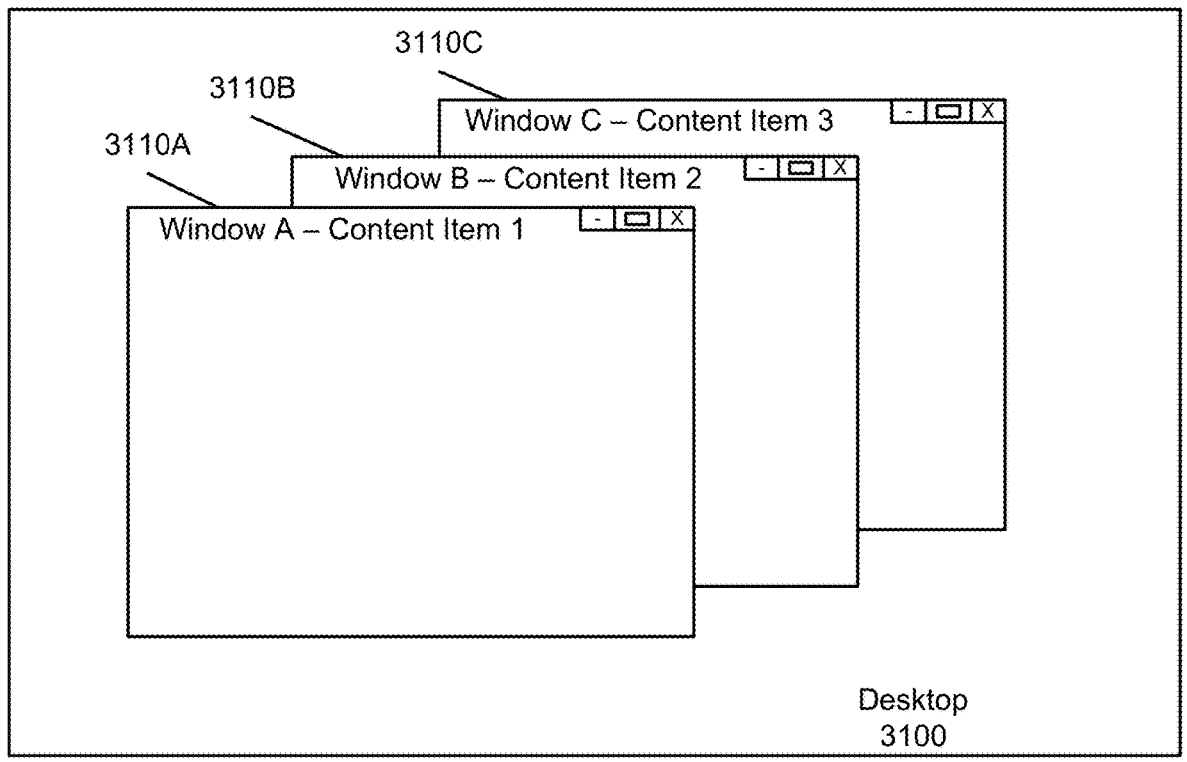
FIGS. 31A and 31B illustrate a user interface element focus change on a desktop display of a device.
Figure 31B:
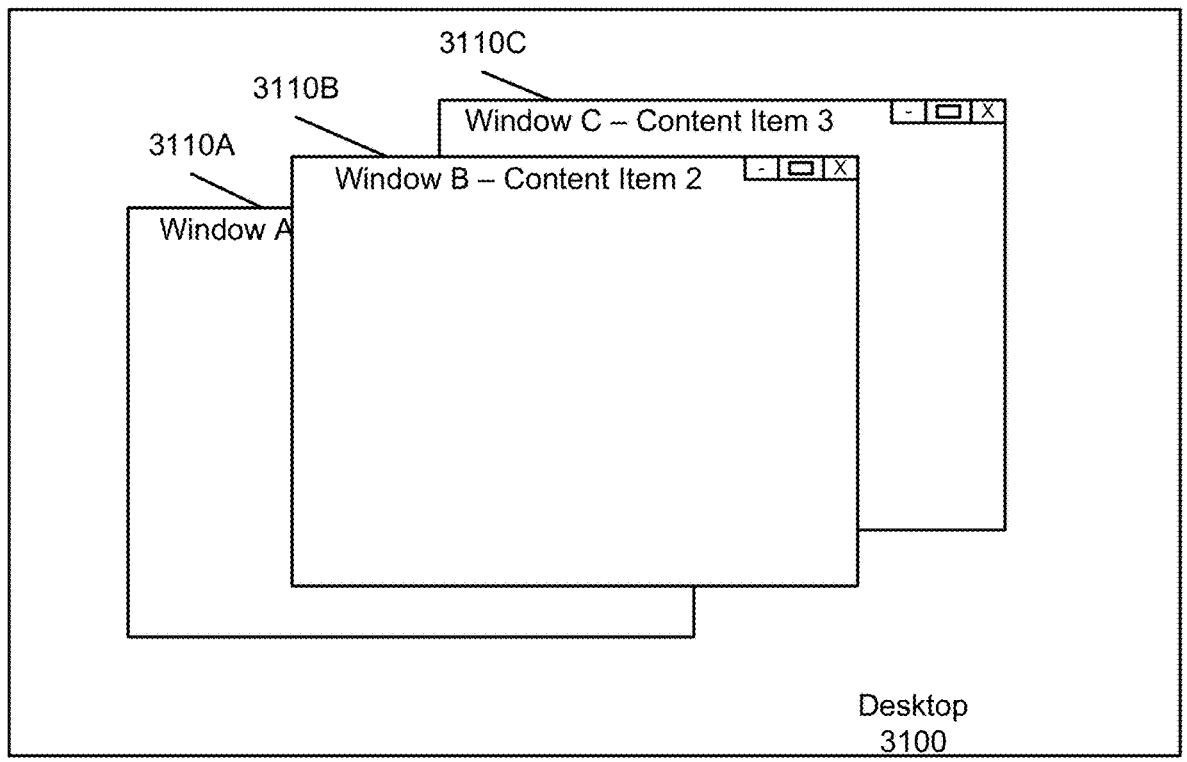

FIGS. 31A and 31B show an example of a user interface element focus change on desktop 300 shown on display 3020 of device 2900. In FIG. 3A, windows 310A, 310B, and 310C are displayed on desktop 300 and viewable by the user. In this embodiment, desktop 300 is a general container or frame maintained by operating system 3045 that encloses user interface elements on display 3020. In FIGS. 3A and 3B, the user interface elements are windows 310 in a desktop computing environment. In other configurations, such as a mobile device, or other display with limited area, only a single user interface element might be displayed at a time. As shown in FIG. 3A, window 310A is the active window, shown as the front window, partially obscuring windows 310B and 310C. In FIG. 3B, focus changed to window 310B, which is now the front window and the active window. The focus may change due to user interaction with window 310B, or due to a process requesting that its window becomes the active window. In certain operating systems and configurations, a user interface element has focus (e.g., is receiving user input) without being the front user interface element.

Referring again to FIG. 30, to open a content item, native application 3055 requests the content item from operating system 3045 and receives a handle to the content item from operating system 3045 for the content item. In some cases, application 3045 does not maintain the handle, and may load the content item data into memory and subsequently close the content item handle even if native application 3055 continues to use data from the content item or if the user enters edits to the content item. Accordingly, open content item handles are often not a reliable way to determine whether an application is interacting with a particular content item. As such, in certain embodiments, further behaviors exhibited by the native applications 3055 are used to determine whether an application is editing a content item.

Native applications 3055 also perform various behaviors when a user modifies a content item, and prior to the user saving the content item. These behaviors vary based on the application and operating system 3045. For example, some native applications 3055 create a temporary content item with a filename that differs from the open content item, for example, leading the temporary content item's filename with a tilde or other recognizable mark. In other examples, the native applications 3055 changes the title of a user interface element associated with the content item, which may or may not be directly viewable by a user. In still further examples, native application 3055 sets a flag indicating the content item has been modified. Native application 3055 may also provide information regarding content item modification in response to a request from another application or the operating system. For example, the Accessibility API in the OS X operating system as described above provides information regarding content items associated with a user interface element. Since an open content item handle may not reliably determine whether a content item is being edited by a native application 3055, these behaviors are used by presence management module 3004 to determine presence relating to editing or modifying a content item as described further below.

Native applications 3055 may typically be executed on device 2900 independently from one another, and may permit communication between the applications and other applications or processes executing on device 2900. Native applications 3055 typically provide information to processes using application programming interfaces (APIs), which permit applications to request information from the executing process. For example, native applications 3055 may present an API permitting a request for user interface elements controlled by the application, or to indicate the title of a user interface element, or to request a path in a file system associated with a content item opened by the native application 3055. Similarly, operating system 3045 may provide similar APIs to requesting processes, such as requesting information about a process that controls a particular user interface element.

Client application 200 manages access to content management system 2910. Client application 200 includes user interface module 3002 that generates an interface to the content accessed by client application 200, as variously illustrated herein, and is one means for performing this function. The generated interface is provided to the user by display 3020. Client application 200 may store content accessed from a content storage at content management system 2910 in local content data store 3008. While represented here as within client application 200, local content data store 3008 may be stored with other data for client device 2900 in non-volatile storage. When local content data store 3008 is stored this way, the content is available to the user and other applications or modules, such as native application 3055, when client application 200 is not in communication with content management system 2910. Content access module 3006 manages updates to local content data store 3008 and uses synchronization logic to communicate with content management system 2910 to synchronize content modified by client device 2900 with content maintained on content management system 2910. One example of such synchronization is provided in U.S. Pat. No. 9,053,165, filed Sep. 27, 2013, which is hereby incorporated by reference in its entirety. Client application 200 may take various forms, such as a stand-alone application, an application plug-in, or a browser extension.

Content management system 2910 may provide additional data for synchronizing content items, such as information designating that a content item has been deleted, or that the device 2900 may be viewing or editing an outdated version of a content item.

Interaction management module 3004 obtains and manages interaction information relating to a user's synchronized content items. As described above, the interaction management module 3004 is typically a distinct module from the native applications 3055 being monitored by interaction management module 3004 for presence information and executes as a separate process. Interaction management module 3004 detects interaction events occurring on device 2900 for synchronized content items. Interaction management module 3004 may detect interaction events by monitoring presence events, or by monitoring received user inputs such as comments and messages. Interaction events indicate that a user has interacted with a content item. Interactions include viewing the content item, editing the content item, saving the content item, commenting on the comment item, sending a message related to the content item, and collaborating in the content item. Interaction management module 3004 sends notifications about interaction events and other interaction information to content management system 2910.

In one embodiment, interaction management module 3004 instructs user interface module 3002 to prompt a user for interaction information. For example, interaction management module 3004 may detect a save of a content item on a device 2900 and instruct user interface module 3002 to prompt the user of the device to comment on changes to the content item associated with the save action. Interaction management module 3004 may store this information in monitored presence data store 3010 or send it to content management system 2910. In one embodiment, interaction management module receives and maintains prompt conditions specifying when users should be prompted for change comments. For example, prompt conditions may specify that a user should only be prompted for change comments if a change is significant (e.g., at least a minimum proportion of the data has been changed, if a change is the first change for a content item, or if a change is the first change by a particular user. Prompt conditions may be specified by users or other implementers of content item synchronization. Interaction management module 3004 determines whether prompt conditions have been met by analyzing changes to content items.

Interaction management module 3004 also receives interaction information, including user notification queues, relating to other users' interactions with content items from content management system 2910 for display to the user. In one embodiment the interaction management module 3004 displays interaction information from user notification queues by attaching an interaction indicator to a user interface element associated with a synchronized content item. In various embodiments, the interaction indicator and associated user interface elements display real-time interaction information, such as presence information, and interaction information relating to past activities. This allows users to view the content item and associated interaction information simultaneously, which provides a more holistic view of a content item, users associated with the content item, and changes made to the content item.

In one embodiment, the interaction management module 3004 provides received notification queue content and other interaction information for display in chronological order so that users may view a sequence of interactions with the content item. Displayed interaction information may include metadata such as timestamps, user identifiers, user photos, and other data. In another embodiment, the interaction module displays interaction information as it is received in a notification channel style. When a new piece of interaction information is received via the user interface, from another device 2900, or from the content management system 2910, it is added to the channel, and users may be notified by the interaction indicator, another user interface element, or by some other method. Displaying interaction information, including notifications, is discussed in more detail below with respect to FIGS. 34A-34D.

In one embodiment, the interaction management module 3004 detects when a user has been provided with a notification about interaction information or has viewed interaction information displayed in the user interface. The interaction management module 3004 may send this information to the content management system 2910 and/or other devices 2900 associated with the user and the content management system 2910 so that the interaction information that has been viewed by a user is tracked across multiple devices 2900. Using this information, the interaction management module 3004 or the content management system 2910 can determine whether a user has viewed interaction information, or been provided with a notification about the interaction information and avoid duplicating notifications so that users are not notified about the same interactions on several devices.

To determine many types of interaction information, interaction management module 3004 receives interaction information through user interface elements, as further described below. To determine presence information related to a synchronized content item, interaction management module 3004 monitors user interface elements associated with native applications 3055. Interaction management module 3004 can monitor all user interface elements, or alternatively monitor just certain user interface elements after the user interface element is associated with a content item. Monitored presence data store 3010 includes information maintained by interaction management module 3004 to indicate that particular user interface elements are monitored to determine actions relating to a synchronized content item.

While shown here as a part of client application 200, in various implementations content access module 3006 and interaction management module 3004 are separated into distinct modules for performing their respective functions. Similarly, various modules and data stores are described separately throughout this disclosure for convenience and in various implementations may be combined or further separated into separate components as desired.

Figure 32:
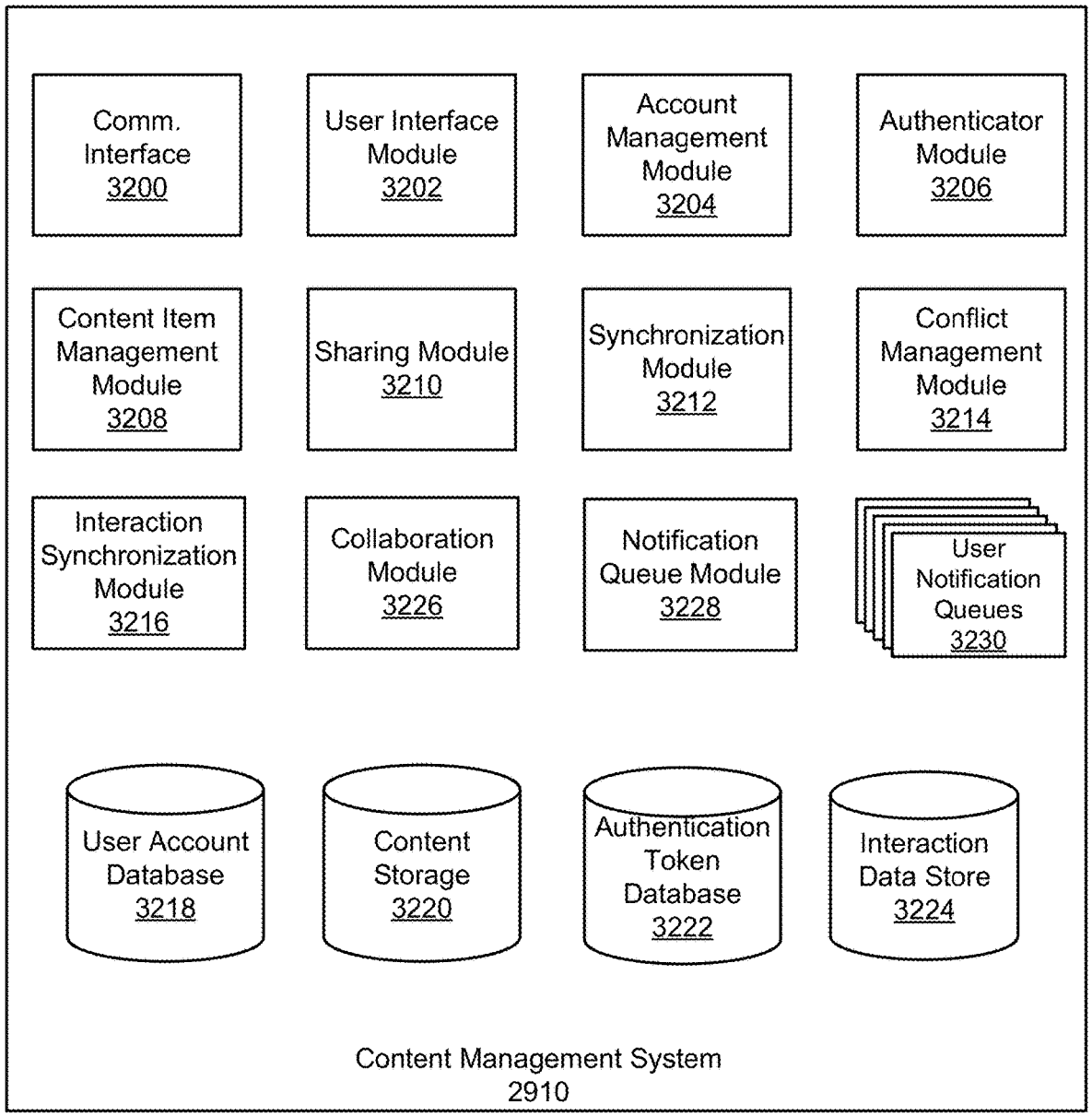
FIG. 32 is an illustration of components of a content management system.

FIG. 32 shows components of content management system 2910 of FIG. 1, according to one embodiment. When using content management system 2910, to facilitate the various content management services a user can create an account with content management system 2910. In one embodiment, the user's account information is maintained in user account database 3218. User account database 3218 can store profile information for registered users. In some cases, the only personal information in the user profile is a username and/or email address. However, content management system 2910 can also be configured to accept additional user information, such as password recovery information, demographics information, payment information, and other details of interest to the implementer. Each user is associated with an identifier, such as a userID or a user name.

User account database 3218 can also include account management information, such as account type, e.g., free or paid; usage information for each user, e.g., file edit history; maximum storage space authorized; storage space used; content storage locations; security settings; personal configuration settings; content sharing data, etc. Account management module 3204 can be configured to update and/or obtain user account details in user account database 3218. Account management module 3204 can be configured to interact with any number of other modules in content management system 2910.

An account can be associated with multiple devices 2900, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder. In one embodiment, the account is a namespace that may be associated with several users, each of whom may be associated with permissions to interact with the namespace.

In one embodiment, the content is stored in content storage 3220. Content storage 3220 can be a storage device, multiple storage devices, or a server. Alternatively, content storage 3220 can be a cloud storage provider or network storage accessible via one or more communications networks. In one configuration, content management system 2910 stores the content items in the same organizational structure as they appear on the device. However, content management system 2910 can store the content items in its own order, arrangement, or hierarchy.

Content storage 3220 can also store metadata describing content items, content item types, and the relationship of content items to various accounts, folders, or groups. The metadata for a content item can be stored as part of the content item or can be stored separately. In one configuration, each content item stored in content storage 3220 can be assigned a system-wide unique identifier.

Content storage 3220 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 3220 stores content items using a version control mechanism that tracks changes to content items, different versions of content items (such as a diverging version tree), and a change history. The change history includes a set of changes that, when applied to the original content item version, produces the changed content item version.

In one embodiment, content management system 2910 automatically synchronizes content items from one or more devices using synchronization module 3212. The synchronization is platform-agnostic. That is, the content items are synchronized across multiple devices 2900 of varying type, capabilities, operating systems, etc. For example, client application 200 synchronizes, via synchronization module 3212 at content management system 2910, content in the file system of device 2900 with the content items in an associated user account on system 2910. Client application 200 synchronizes any changes to content items in a designated folder and its sub-folders with the synchronization module 3212. Such changes include new, deleted, modified, copied, or moved files or folders. Synchronization module 3212 also provides any changes to content associated with device 2900 to client application 200. This synchronizes the local content at device 2900 with the content items at content management system 2910.

Conflict management module 3214 determines whether there are any discrepancies between versions of a content item located at different devices 2900. For example, when a content item is modified at one device and a second device, differing versions of the content item may exist at each device. Synchronization module 3212 determines such versioning conflicts, for example by identifying the modification time of the content item modifications. Conflict management module 3214 resolves the conflict between versions by any suitable means, such as by merging the versions, or by notifying the device of the later-submitted version.

A user can also view or manipulate content via a web interface generated by user interface module 3202. For example, the user can navigate in web browser 3050 to a web address provided by content management system 2910. Changes or updates to content in content storage 3220 made through the web interface, such as uploading a new version of a file, are synchronized back to other devices 2900 associated with the user's account. Multiple devices 2900 may be associated with a single account and files in the account are synchronized between each of the multiple devices 2900.

Content management system 2910 includes communications interface 3200 for interfacing with various devices 2900, and with other content and/or service providers via an Application Programming Interface (API), which is one means for performing this function. Certain software applications access content storage 3220 via an API on behalf of a user. For example, a software package, such as an app on a smartphone or tablet computing device, can programmatically make calls directly to content management system 2910, when a user provides credentials, to read, write, create, delete, share, or otherwise manipulate content. Similarly, the API can allow users to access all or part of content storage 3220 through a web site.

Content management system 2910 can also include authenticator module 3206, which verifies user credentials, security tokens, API calls, specific devices, etc., to determine whether access to requested content items is authorized, and is one means for performing this function. Authenticator module 3206 can generate one-time use authentication tokens for a user account. Authenticator module 3206 assigns an expiration period or date to each authentication token. In addition to sending the authentication tokens to requesting devices, authenticator module 3206 can store generated authentication tokens in authentication token database 3222. Upon receiving a request to validate an authentication token, authenticator module 3206 checks authentication token database 3222 for a matching authentication token assigned to the user. Once the authenticator module 3206 identifies a matching authentication token, authenticator module 3206 determines if the matching authentication token is still valid. For example, authenticator module 3206 verifies that the authentication token has not expired or was not marked as used or invalid. After validating an authentication token, authenticator module 3206 may invalidate the matching authentication token, such as a single-use token. For example, authenticator module 3206 can mark the matching authentication token as used or invalid, or delete the matching authentication token from authentication token database 3222.

Content management system 2910 includes a sharing module 3210 for sharing content publicly or privately. Sharing content publicly can include making the content item accessible from any computing device in network communication with content management system 2910. Sharing content privately can include linking a content item in content storage 3220 with two or more user accounts so that each user account has access to the content item. The content can also be shared across varying types of user accounts.

In some embodiments, content management system 2910 includes a content management module 3208 for maintaining a content directory that identifies the location of each content item in content storage 3220, and allows client applications to request access to content items in the storage 3220, and which is one means for performing this function. A content entry in the content directory can also include a content pointer that identifies the location of the content item in content storage 3220. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 3210 adds a user account identifier to the content entry associated with the content item, thus granting the added user account access to the content item. Sharing module 3210 can also be configured to remove user account identifiers from a content entry to restrict a user account's access to the content item.

To share content publicly, sharing module 3210 generates a custom network address, such as a URL, which allows any web browser to access the content in content management system 2910 without any authentication. The sharing module 3210 includes content identification data in the generated URL, which can later be used by content management system 2910 to properly identify and return the requested content item. For example, sharing module 3210 can be configured to include the user account identifier and the content path in the generated URL. The content identification data included in the URL can be transmitted to content management system 2910 by a device to access the content item. In addition to generating the URL, sharing module 3210 can also be configured to record that a URL to the content item has been created. In some embodiments, the content entry associated with a content item can include a URL flag indicating whether a URL to the content item has been created.

Interaction synchronization module 3216 receives presence information from a device, stores it as part of a presence record in interaction data store 3224 and determines a user presence with respect to a content item. Each user may be associated with a user presence describing presence records associated with that user with respect to a content item, which may be without reference to any particular user device, process, or user interface element. While presence information may describe presence with respect to a particular user interface element or process, this presence associated with a user is termed a user presence. Example user presence includes collaborating, editing, viewing, open, and not present. In this example, a "collaborating" user presence indicates the content item is associated with a user interface element that is presented for viewing and modification on two or more devices, an "editing" user presence indicates the content item is associated with a user interface element that has modified the content item, a "viewing" user presence indicates the content item is associated with an active user interface element on a device 2900, while an "open" user presence indicates a user interface element is associated with the content item and has opened the content item, but has not yet closed the content item. Various embodiments may use more or fewer user presences. For example, one embodiment includes only "editing" "viewing" and "not present," in which case user interface elements that have opened the content item but are not the active user interface element may be treated as viewing or not presence, according to the configuration of the system. Obtaining and tracking presence information is also further described in U.S. Pat. No. 9,413,708, incorporated by reference herein.

Interaction synchronization module 3216 manages synchronization of interaction information across devices 2900.

Devices 2900 provide interaction information to interaction synchronization module 3216. Interaction synchronization module 3216 stores interaction information in interaction data store 3224. Interaction synchronization module 3216 sends interaction information about synchronized content items to synchronized devices 2900 for display to users. Interaction synchronization module 3216 may further send instructions to notify users of new or unviewed interaction information. In one embodiment, devices 2900 send viewing information to interaction synchronization module 3216 indicating whether and when users have viewed interaction information. Viewing information is stored in interaction data store 3224. In another embodiment, viewing information indicates whether and when users have interacted with interaction information. Interaction synchronization module 3216 may use this information to avoid duplicate notifications on multiple devices 2900 associated with the same user. For example, if a user is notified of new interaction information on a first device 2900 and views the interaction information, this event will be stored such that the user will not be notified about the same interaction information on a second device 2900.

In one embodiment, interaction information stored in interaction data store 3224 is accessible by client application 200 so that users may view and interact with stored interaction information related to a content item. Stored interaction information may include metadata such as interaction event timestamps and version information. Version information associates interaction events with different versions of a content item. In one embodiment, stored interaction information is provided to users of devices 2900 as a content item history log, in which interaction information and metadata is displayed chronologically. In this way, users may easily view interaction information in one place and better understand the context of changes, edits, views and comments to a content item. For example, a user may see that a content item was edited at 3:00 PM and the editing user provided the comments "changed the conclusion paragraph" at 3:01 PM. This gives users a comprehensive view of the entire editing process in one place.

In one embodiment, content management system 2910 includes collaboration module 3226. Collaboration module 3226 can be configured to facilitate collaboration between devices 2900. For instance, collaboration module 3226 may initiate a device handshake by sharing a device's address with another device so that collaboration may occur. Further, collaboration module 3226 may be configured to perform any of the tasks that are performed by collaboration module 3007 of a device 2900 or by any other module of client application 200.

Notification queue module 3228 creates and manages user notification queues 3230 for shared content items. User notification queues 3230 are stored at content management system 2910 and sent to devices 2900. A user notification queue 3230 is a group of one or more interactions with a shared content item that may be presented to a user to indicate recent interactions with the shared content item by sharing users. In one embodiment, each sharing user associated with a content item has a user notification queue 3230 corresponding to that content item. Different users' user notification queues for a particular content item may differ.

In one embodiment, notification queue module 3228 receives a notification of an interaction event, and determines interactions that are candidates to be added to user notification queues 3230. The notification queue module 3228 modifies user notification queues 3230 corresponding to a shared content item. Modifying user notification queues 3230 may include adding candidate interactions to the notification queue and removing interactions already present in the notification queue. When an interaction event corresponding to a shared content item is received by the content management system 2910, the notification queue module 3220 determines whether to add interactions to and/or remove interactions from the sharing users' user notification queues 3230. Types of interactions added to a user notification queue 3230 may include content item views, content item edits, content item collaborations, content item comments, and content item messages.

In one embodiment, interactions have an associated interaction priority. An interaction priority specifies a relative priority of an interaction type to other interaction types. For example, a content item edit may have a higher priority than a content item view. Interaction priorities may be specified by an implementer of the content management system 2910 or by a user of the content management system 2910. The notification queue module 3228 determines the interaction types and interaction priorities for candidate interactions and interactions in user notification queues 3230. In various embodiments, the notification queue module 3228 selects higher priority interactions to add to user notification queues 3230 and lower priority interactions to remove from user notification queues 3230. For example, the notification queue module 3228 may compare the priority of a candidate interaction by a user A to the priority of interactions by user A already present in a notification queue 3230. If the candidate interaction is a lower priority interaction than an interaction in the user notification queue 3230, the candidate interaction is not added to the queue. If the candidate interaction is a higher priority interaction than an interaction in the user notification queue 3230, the candidate interaction is added to the queue, and the interaction already in the queue may be removed from the queue. This allows users to be presented other users' higher priority interactions with a content item, which provides important information for the users without also providing less important information that may confuse the user or waste space in a user interface element.

Notification queue module 3228 may send user notification queues 3230 to devices 2900. In one embodiment, notification queue module 3228 sends a user notification queue 3230 responsive to receiving a notification that a user has accessed a content item. The access notification may come directly from device 2900 or from interaction synchronization module 3216. The access notification may be generated responsive to detecting a presence event consistent with access of the content item, such as opening a content item for viewing or editing. In one embodiment, notification queue module 3228 clears a user notification queue 3230 responsive to receiving a notification that the associated user viewed the notification queue. This way, the user will not be presented with notifications that the user has already viewed.

Content management system 2910 may be implemented using a single computer, or a network of computers, including cloud-based computer implementations. For the purposes of this disclosure, a computer is a device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 2910 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 2910 are sufficiently complex as to require implementation on a computer system, and cannot be performed in the human mind simply by mental steps.

In one configuration, components described below with reference to content management system 2910 are incorporated into devices 2900 that share and synchronize content items without management by content management system 2910. These devices 2900 may synchronize content and share interaction information over network 120 or via a direct connection as described above. In this configuration, devices 2900 may incorporate the functionality of synchronization module 3212, conflict management module 3214, interaction synchronization module 3216, and other modules and data stores for incorporating functionality described below as provided by content management system 2910. Accordingly, devices 2900 in this configuration operate in a peer-to-peer configuration and may do so without content management system 2910 or network 120.

Figure 33:
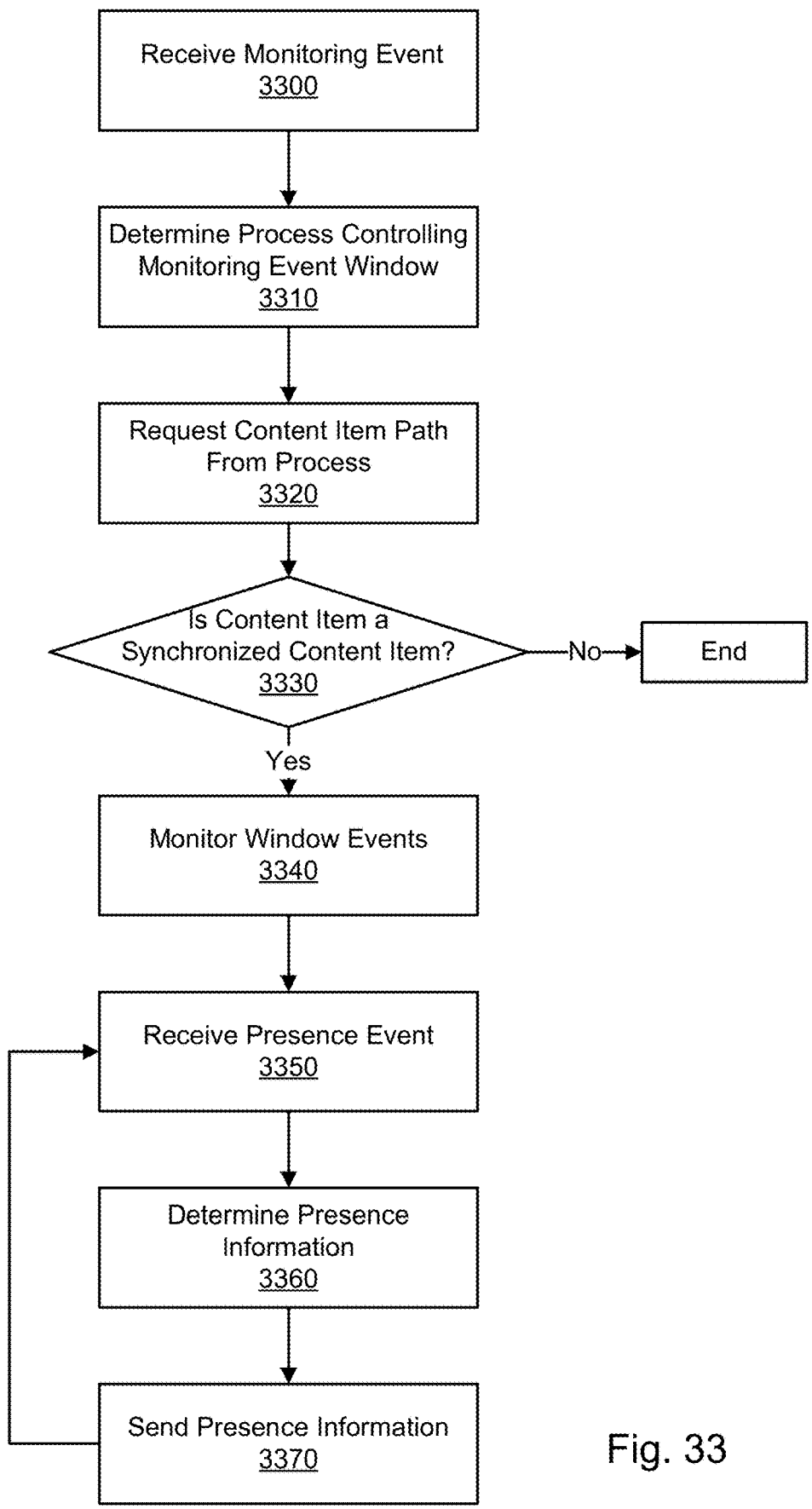
FIG. 33 is an illustration of an example process for determining presence information associated with a content item.

FIG. 33 shows an example process for determining presence information associated with a content item according to one embodiment. This process is typically performed by interaction management module 3004. Where the user interface elements are monitored only after being associated with a content item, interaction management module 3004 uses events indicating that a content item is being opened by an application or user interface element to determine whether to monitor a user interface element. This is one example of an event that may associate a content item with a user interface element to initiate monitoring of the user interface element, termed a monitoring event. In other embodiments, a selection of user interface elements to monitor is determined in another way, or all user interface elements are monitored, in which case the interaction management module 3004 may not use monitoring events. In another embodiment, the monitoring event includes a process saving a content item.

If enabled by operating system 3045, the interaction management module 3004 may register with operating system 3045 to receive monitoring events for specific applications. In these embodiments, operating system 3045 notifies interaction management module 3004 when a request to open or save a content item is received by operating system 3045. In this embodiment, interaction management module 3004 receives 3300 a monitoring event that indicates a window or other user interface element is interacting with a content item, which may be a synchronized content item (i.e., the process is interacting with the content item in a particular user interface element). The monitoring event designates at least a user interface element that triggered the monitoring event. In other embodiments, interaction management module 3004 monitors events associated with user interface elements from time-to-time (e.g., five-minute intervals) and queries whether the user interface elements are associated with any open content items. According to operating system 3045 and native application 3055 configuration, this query may be directed to operating system 3045 or native application 3055. When a user interface element is associated with a newly opened content item, that newly opened content item is treated as a monitoring event to determine whether the newly opened content item is a content item synchronized with content management system 2910 and that presence information should be determined for the newly opened content item.

When the monitoring event is received, interaction management module 3004 determines 3310 which process is responsible for the user interface element associated with the monitoring event. Interaction management module 3004 typically determines the process by requesting the process ID associated with the user interface element from operating system 3045. In some embodiments, the interaction management module 3004 identifies a process by requesting an identification of the process from the user interface element itself.

To confirm that the process and user interface element are correctly associated with one another and that the user interface element is still active, interaction management module 3004 may also request from the process the identity of the currently active user interface element. The interaction management module 3004 confirms that the currently active user interface element received from the process matches the user interface element associated with the monitoring event.

Using the process identifier, interaction management module 3004 requests 3320 any open content item from the process to obtain an associated directory path for the content item. The interaction management module 3004 may designate the user interface element associated with the monitoring event with the request for the open content item's path. The interaction management module 3004 requests the open item from the process or operating system using an interface available interface to the process or operating system. As one example, in the OS X operating system, the accessibility API may be used to access information relating to a content item and content item path for a user interface element, as known in the art. Using the content item path provided by the process, the interaction management module 3004 determines whether the opened content item path corresponds to any synchronized content items. If so, interaction management module 3004 determines that the content item accessed by the process is a content item synchronized to content management system 2910 and associates that process and user interface element with the content item. In other embodiments, other methods may be used to determine whether a content item accessed by the process is a synchronized content item.

If the content item is synchronized 3330 to content management system 2910, interaction management module 3004 stores information relating to the content item, process, and user interface element, to monitor 3340 the user interface element for events. When the content item associated with the monitoring event is not synchronized, the process may end or may continue by displaying a synchronization interface to a user. Monitoring information is stored in monitored presence data store 3010. To monitor and subsequently receive presence events related to the user interface element, interaction management module 3004 registers to receive events associated with the user interface element. The registration process by the interaction management module 3004 varies according to the configuration of device 2900. Typically the interaction management module 3004 registers a request to receive presence events from operating system 3045 or from the applicable process or user interface element. While the monitoring events determine whether a user interface element or process is associated with a synchronized content item, presence events are events that may indicate a change in state of a user's presence relating to the user interface element or process associated with a content item. Example presence events include a change in focus of a user interface element, closing a user interface element, closing a content item, opening a content item, and so forth based on the types of presence recognized by the interaction management module 3004. In various configurations, the presence events used by interaction management module 3004 depend on the events operating system 3045 and native application 3055 make available for receipt by interaction management module 3004.

The presence events are used to determine presence information associated with the content item to which the presence event relates. For example, a presence event indicating that a user interface element that is associated with a content item has the focus will indicate that the user is viewing the content item, and hence the presence information for that content item indicates that state. Likewise, a presence event indicating that a user interface element unrelated to a content item has gained focus indicates that the content item associated with a previously focused user interface element has lost focus, and thus indicates that user is no longer be viewing the content item. Thus, presence information provides a level of semantic interpretation of the underlying presence event itself.

In addition to receiving presence events that the interaction management module 3004 registered for, presence events may also be initiated by interaction management module 3004 to confirm that presence information has not changed for a monitored user interface element. These presence events may be initiated if a threshold amount of time passed since the last presence event for a particular user interface element or process, or at particular intervals, e.g., every five minutes.

In addition to registering for presence events, interaction management module 3004 may receive interaction events in other ways. In one embodiment, users may expressly indicate interaction information through a user interface element. The user interface element can be configured to allow the user to indicate, for example, that a user intends to revise a content item, to indicate that intent to other users who are editing or viewing the content item, for example by selection of a menu item or icon that represents the particular intent. The user interface element can also be configured to allow a user to indicate other intentions of the user, such as a user's intention to no longer view a content item, or to expressly indicate that a user is not or will not be present for a content item. Other users may use such "not present" intention to know that the content item is free for editing. User input interaction events may also include messages or chat features to be disseminated to other users associated with the content item, for example, to transmit a message to other users currently viewing the content item on other devices.

When a presence event is received 3350, interaction management module 3004 determines 3360 whether any presence information has changed since the last presence event related to a monitored user interface element. For user-initiated interaction information, the interaction information may be the information provided by the user, for example, the user's selection of a user interface element indicating that the user intends to modify a content item, or a user's chat message. For presence events, the interaction management module 3004 queries the monitored process to determine the status of the monitored user interface element. In particular, the interaction management module 3004 queries the process to determine if the monitored user interface element is the active user interface element. When the monitored user interface element is the active user interface element, the content item is being viewed by the user.

In some embodiments, in addition to detecting user presence with respect to a content item, interaction management module 3004 also determines whether the content item is being or has been modified by the user. This further aspect enables presence information to be reported more granularly, for example with an indication that a user has a presence with respect to the content item as an editor rather than as a viewer. As the particular actions performed by applications when a content item is being modified may vary as described above, detecting one of these actions by interaction management module 3004 indicates that the process has edited the content item. For example, according to the type of actions expected by the process when the content item is edited, interaction management module 3004 may query the process to determine if the process indicates the content item has been flagged as modified, if the title information of the user interface element has changed, if a temporary file has been saved or cached, or any other data that suggests the content item has been modified. Interaction management module 3004 may also query the operating system to determine if a content item has been saved that matches a temporary content item format, for example, a content item with a filename similar to the content item, but with a tilde or other specialized variation of the filename. Such modifications indicate that the presence information associated with the content item should reflect that the user is editing the content item.

After determining 3360 the presence information, any new presence information for a user interface element may be stored as monitored presence data store 3050. This presence information in one embodiment is stored on a user interface element-by-user interface element basis, such that multiple user interface elements by one process may be associated with the same content item, and have presence information individually managed. In one embodiment, presence information may change based on the current presence status. For example, when the presence information for a content item reflects that the content item is being edited, in one embodiment the presence for the content item in a user interface element is not changed when a user changes focus to another user interface element. Instead, the edited status is maintained with respect to that user interface element until a presence event indicates the user interface element is closed. In another embodiment, since editing has the potential to introduce modifications to the content item, in one embodiment the presence information for an edited document is not changed until the interaction management module 3004 receives a notification that modifications to the content item are either committed or the modifications are discarded.

A content item with presence information indicating it is being viewed may have that status change when the user interface element loses focus, or within a threshold period of time of losing focus. This may be the case even if the user interface element associated with the content item is still open. In one embodiment, "viewed" presence information indicates whether a content item is associated with an active user interface element. In one embodiment, "viewed" presence information is retained until the user interface element is not active (or has lost focus) for longer than a threshold amount of time. In one embodiment, the content item is considered "viewed" while the content item is open by an application.

When there is a change to the interaction information, interaction management module 3004 sends 3370 the presence information to content management system 2910. In one embodiment, the sent presence information includes an identifier of the content item, the process id, the user interface element id, and the presence status. The presence information may further include metadata, such as versioning notes and presence event timestamps.

In one embodiment, the content management system 2910 maintains received interaction information for the synchronized content item, for example in a data store of the content management system 2910. The content management system 2910 may provide received interaction information to other devices 2900 that are synchronized with respect to the content item for display to users.

Figure 34A:
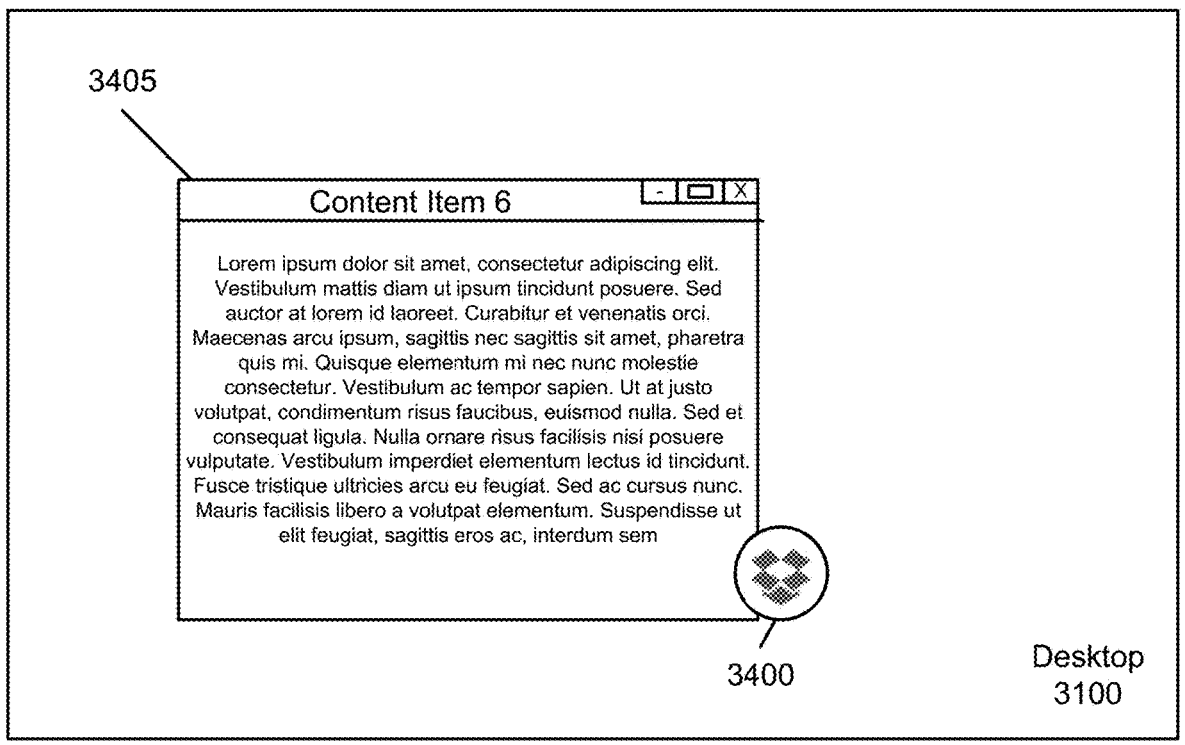
FIGS. 34A-34D is an illustration of an example user interfaces displaying interaction information.

FIGS. 34A-34D show example user interfaces displaying interaction information, including user notification queue content. These user interfaces may be generated, for example, by user interface module 3002, and is one means for doing so. In FIG. 34A, the example window 3405 of the user interface displays a synchronized content item, here "content item 34." The example user interface displays interaction information received from content management system 2910. To display interaction information, interaction management module 3004 provides interaction indicator(s) 3400 along a boundary or border of the window associated with the content item.

Interaction indicator 3400 is displayed along with the window associated with the content item, and in one embodiment interaction management module 3004 tracks the location of the window and displays interaction indicator 3400 adjacent to or near the window, for example alongside a border or boundary of the window. The interaction indicator 3400 may be located on any convenient area of display 3020. In one embodiment the interaction indicator is displayed proximal the associated user interface element of the content item so as to visually indicate to the user the relationship between the interaction indicator and the specific content item. In addition, the display of the interaction indicator along a boundary or border of the window increases the likelihood that the user will notice interaction indicator 3400. In one embodiment, the interaction indicators 3400 are displayed on or alongside a vertical edge of the window containing the content item (e.g., right edge as shown FIG. 34A). Alternatively, interaction indicator 3400 may be shown in a separate area of the display, such as a taskbar, or tray icon or may be a separate user interface element that does not interact with the user interface element of the content item. Though shown here as a single interaction indicator 3400, any number of interaction indicators 3400 may be shown related to the content item.

Figure 34B:
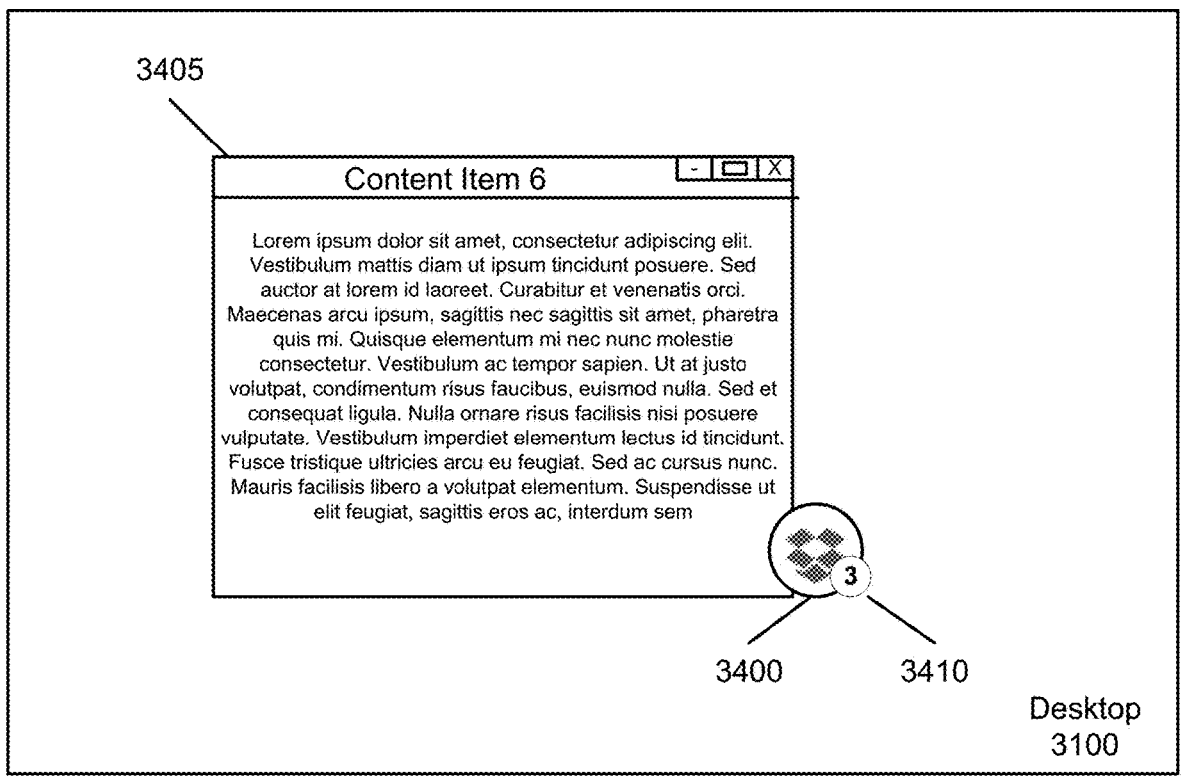

In FIG. 34B, the interaction indicator 3400 includes a badge element 3410. Badge element 3410 may include a number of other visual elements to provide more information about interaction information. For example, the badge element 3410 may have a number representing a number of unviewed interaction events, as illustrated in FIG. 34B. In other embodiments, the badge element 3410 may be a visual element such as an icon to indicate unviewed interaction events to a user.

Figure 34C:
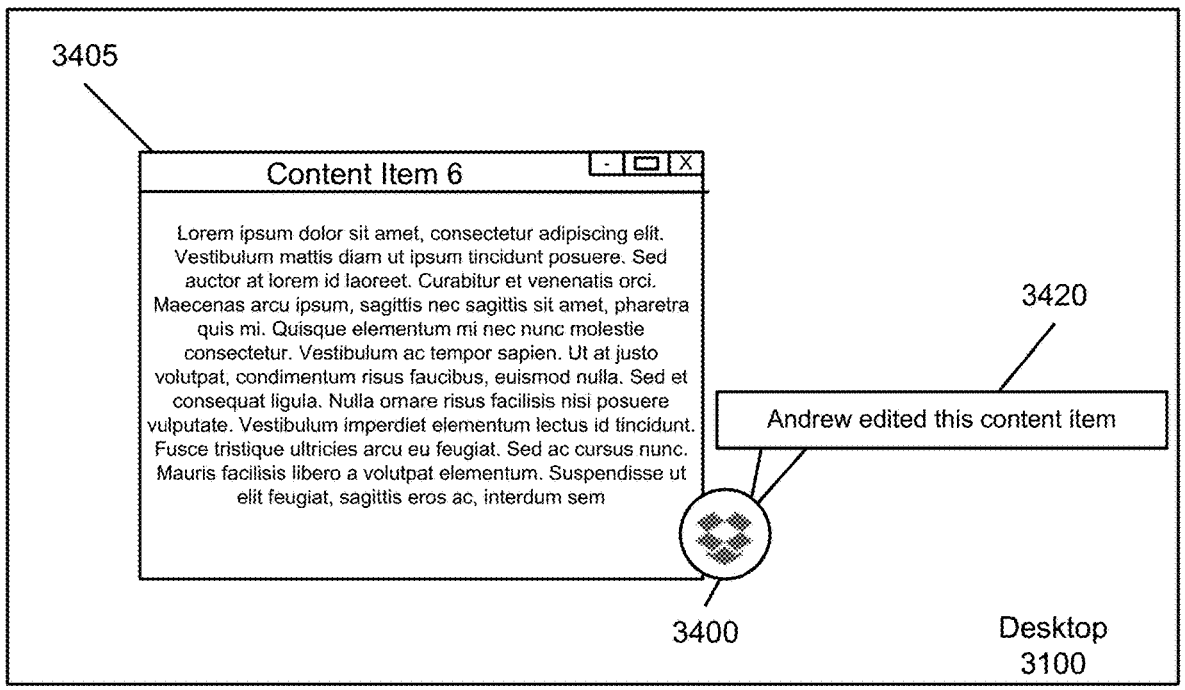

Turning to FIG. 34C, supplemental interaction indicator 3420 may appear when a user selects or hovers over interaction indicator 3400 to provide further information or interfaces for the user. In the example shown in FIG. 34C, supplemental interaction indicator 3420 describes a recent interaction with the content item, specifically that Andrew edited content item 34. Supplemental interaction indicator 3420 may also appear without action by the user, for example, when a presence changes, to indicate a new user is viewing or editing the document.

Figure 34D:
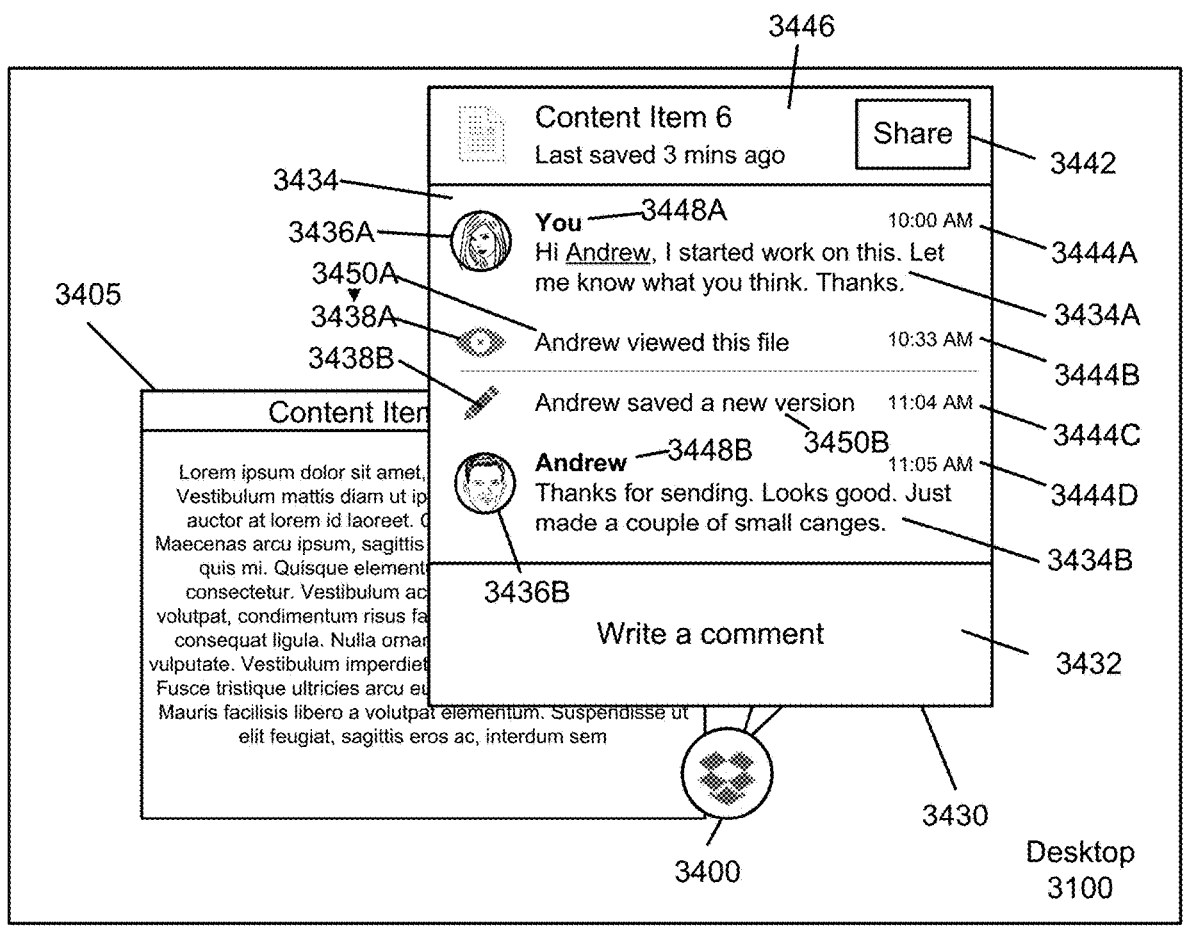

FIG. 34D shows an example user interface with an interaction element 3430 through which a user may view and enter interaction information. This interface includes interaction indicators 3400, in addition to further user interface elements. The interaction element 3430 may be presented in lieu of the example of FIGS. 34A-34C, or may be presented as a supplemental element providing additional data regarding the content item.

The interaction element 3430 includes content item information section 3430, which displays the content item name, as well as the time of a last interaction event, such as a save action. In the example of FIG. 34D, the content item information section 3430 indicates that Content Item 34 was last saved 3 minutes ago. The interface also includes sharing element 3442 that allows users to share the content item with other users, either via synchronization or other methods known in the art.

The example interface of FIG. 34D includes interaction viewing section 3434, which displays interaction information and associated information to users. Associated information may include times that interactions occurred and user information associated with interactions. In the example of FIG. 34D, interaction viewing section 3434 contains messages 3434A-B and presence information 3450A-B. For each item of displayed interaction information, interaction viewing section 3434 contains interaction times 3444A-D. In one embodiment, as shown in FIG. 34D, interaction times 3444A-D are expressed as a time that the interaction occurred. In another embodiment, interaction times may be expressed as a relative time, for example, how much time has elapsed since the interaction occurred.

The interaction viewing section 3434 contains user images 3436A-B for messages and other interaction information associated with users. User images 3436A-B may be received from the content management system 2910. The interaction viewing section 3434 contains user identifiers 3448A-B, which may be user IDs, names, or other identifiers. The interaction viewing section 3434 may include other icons or graphics for interaction information. For example, icons 3438A-B may correspond to displayed presence information. Icon 3438A is an eye to represent viewing, and icon 3438B is a pencil to represent editing or saving a new version.

In one embodiment, users may interact with (e.g., click, hover over, etc.) various elements within the interaction viewing section 3434 to view additional information. For example, selecting or hovering over name elements 3448A-B or user images 3436A-B may allow the user to view additional user information related to that user.

This interface also provides a chat interface for users to communicate with other users associated with the content item. The chat interface permits users to enter and receive messages to other users. A text input element 3432 allows users to enter messages to other users, and interaction viewing element 3434 allows users to view messages. The chat interface may permit users to specifically discuss information relating to that content item, such as when a user expects to finish editing the item. These messages are received by interaction management module 3004 as interaction information and sent to other clients synchronized to the content item. This permits users to chat directly about a content item, even if the native application provides no chat functionality.

Figure 35:
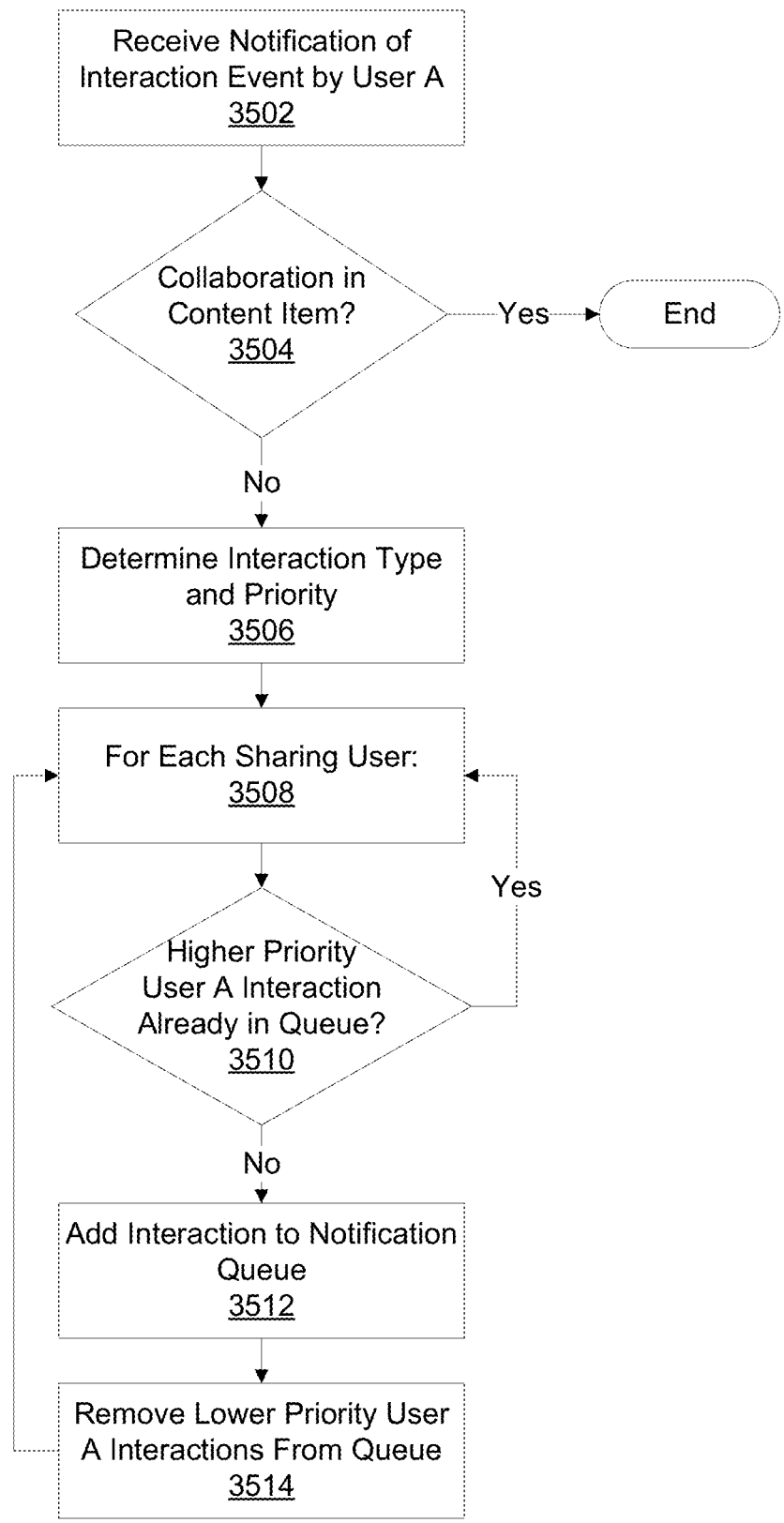
FIG. 35 is an illustration of an example process for updating notification queues for sharing users.

FIG. 35 shows an example process for updating notification queues for sharing users according to one embodiment. Content management system 2910 receives 3502 a notification of an interaction event for a shared content item. The interaction event indicates a new interaction with the shared content item by a sharing user, which we refer to here for purposes of explanation as "User A."

In one embodiment, content management system 2910 determines 3504 whether users are collaborating in the content item—that is, whether more than one user currently has the document open for viewing or editing. If users are collaborating in the content item, the process ends, and the notification is not added to the users' notification queues. If users are not currently collaborating in the content item, the content management system 2910 proceeds with updating the notification queues for the content item for each sharing user.

Content management system 2910 determines 3506 the interaction type and the priority of the new interaction. Content management system 2910 uses the interaction type and the priority of the new interaction to determine whether to add the interaction to each user's notification queue for the content item. For each sharing user, content management system 2910 determines 3510 whether the notification queue already includes an interaction by the sharing user A with a higher priority than the priority of the new interaction. If the notification queue does already include a higher priority interaction by the sharing user A, the notification queue is not updated, and the process proceeds from step 3508 with the next user. If the notification queue does not already include a higher priority interaction by the sharing user A, content management system 2910 adds 3512 the new interaction to the notification queue. In one embodiment, content management system 2910 removes 3514 lower priority interactions by the sharing user A from the notification queue.

Figure 36:
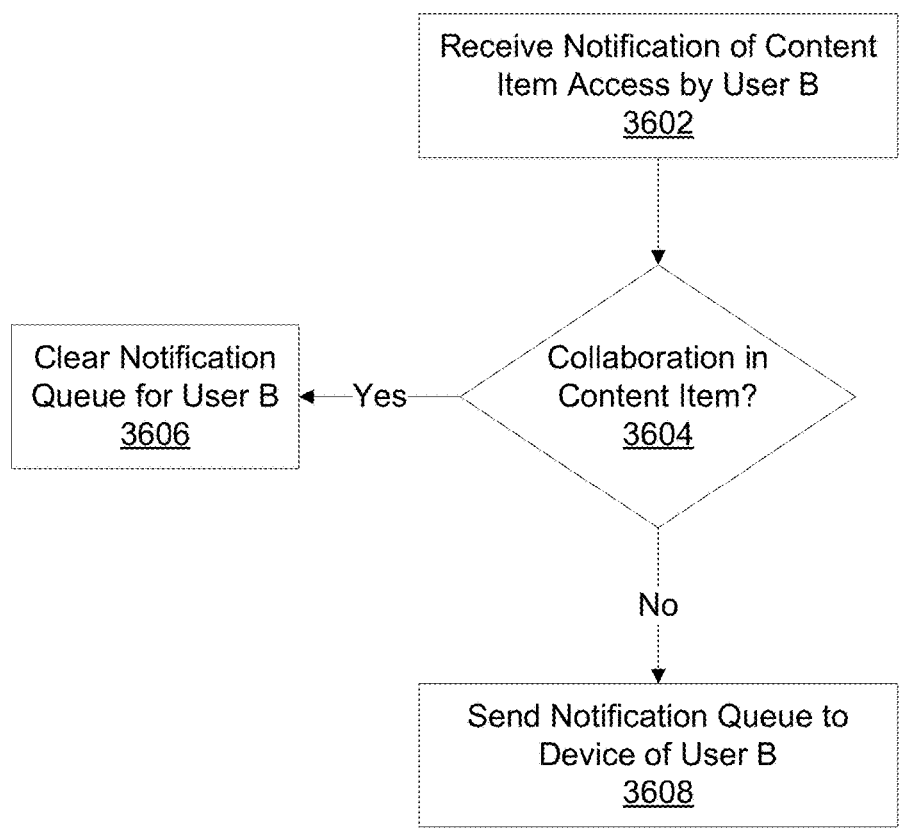
FIG. 36 is an illustration of an example process for sending a notification queue to a device accessing a content item.

FIG. 36 shows an example process for sending a notification queue to a device accessing a content item according to one embodiment. Content management system 2910 receives 3602 a notification that a content item is accessed by sharing user B. Content management system 2910 determines 3604 whether the sharing user B is collaborating in the content item. If the sharing user B is collaborating in the content item, content management system 2910 clears 3606 the sharing user B's notification queue for the content item without delivering the queue. Alternatively, if the sharing user B is not collaborating in the content item, content management system 2910 sends the sharing user B's notification queue for the content item to a device 2900 of the sharing user B.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

The functions performed by the modules and various described user interface elements are implemented by the algorithms and procedures described above. In one embodiment, a software module is implemented with a computer program product comprising a non-transitory tangible computer-readable storage medium containing computer program code, which can be executed by a computer processor for performing any or all of the steps, operations, or processes described. The program code of a module can be either executable object code (compiled from source code), source code (including any form of scripting language), or other forms of interpreted, declarative, or procedural programming.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory tangible computer readable storage medium, which may be coupled to a computer system bus, by which a processor of the computing device accesses the storage medium. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   detecting a selection of a first identifier and of a second identifier in a native application interface; and
   in response to detecting the selection of the first identifier and the second identifier:
      determining that both the first identifier and the second identifier are identifiers for a first content item type from a plurality of content item types, wherein the plurality of content item types further comprises a second content item type, the first content item type corresponding to files and the second content item type corresponding to folders, and
      in response to determining that both the first identifier and the second identifier are identifiers for the first content item type, causing a share bar graphical element to be displayed with text stating a count that reflects at least the first identifier and the second identifier and an indication that both identifiers are identifiers for the first content item type, the share bar graphical element being programmatically associated with a function to share selected content items.

2. The method of claim 1, wherein the first content item type represents a file.

3. The method of claim 1, further comprising detecting a selection of another content item of the first content item type, and updating the share bar graphical element to indicate that three content items of the first content item type have been selected for sharing.

4. The method of claim 1, wherein the second content item type represents a folder.

5. The method of claim 1, wherein functionality of the share bar is facilitated using a content management system.

6. The method of claim 5, wherein the native application interface includes a field configured to receive a message associated with the first identifier and the second identifier, and wherein the content management system transmits the message to identified recipients associated with the selected content items.

7. The method of claim 1, further comprising:
  detecting a selection of the share bar graphical element; and
  sharing the selected content items with at least one other client device.

8. A non-transitory computer-readable medium comprising memory with instructions encoded thereon that, when executed by one or more processors, cause the one or more processors to perform operations, the instructions comprising instructions to:
  detect a selection of a first identifier and of a second identifier in a native application interface; and
  in response to detecting the selection of the first identifier and the second identifier:
    determine that both the first identifier and the second identifier are identifiers for a first content item type from a plurality of content item types, wherein the plurality of content item types further comprises a second content item type, the first content item type corresponding to files and the second content item type corresponding to folders, and
    in response to determining that both the first identifier and the second identifier are identifiers for the first content item type, cause a share bar graphical element to be displayed with text stating a count that reflects at least the first identifier and the second identifier and an indication that both identifiers are identifiers for the first content item type, the share bar graphical element being programmatically associated with a function to share selected content items.

9. The non-transitory computer-readable medium of claim 8, wherein the first content item type represents a file.

10. The non-transitory computer-readable medium of claim 8, the instructions further comprising instructions to detect a selection of another content item of the first content item type, and update the share bar graphical element to indicate that three content items of the first content item type have been selected for sharing.

11. The non-transitory computer-readable medium of claim 8, wherein the second content item type represents a folder.

12. The non-transitory computer-readable medium of claim 8, wherein functionality of the share bar is facilitated using a content management system.

13. The non-transitory computer-readable medium of claim 12, wherein the native application interface includes a field configured to receive a message associated with the first identifier and the second identifier, and wherein the content management system transmits the message to identified recipients associated with the selected content items.

14. The non-transitory computer-readable medium of claim 8, the instructions further comprising instructions to:
  detect a selection of the share bar graphical element; and
  share the selected content items with at least one other client device.

15. A system, comprising:
  memory with instructions encoded thereon; and
  one or more processors that, when executing the instructions, are caused to perform operations comprising:
    detecting a selection of a first identifier and of a second identifier in a native application interface; and
    in response to detecting the selection of the first identifier and the second identifier:
      determining that both the first identifier and the second identifier are identifiers for a first content item type from a plurality of content item types, wherein the plurality of content item types further comprises a second content item type, the first content item type corresponding to folders and the second content item type corresponding to files, and
      in response to determining that both the first identifier and the second identifier are identifiers for the first content item type, causing a share bar graphical element to be displayed with text stating a count that reflects at least the first identifier and the second identifier and an indication that both identifiers are identifiers for the first content item type, the share bar graphical element being programmatically associated with a function to share selected content items.

16. The system of claim 15, wherein the first content item type represents a file.

17. The system of claim 15, the operations further comprising detecting a selection of another content item of the first content item type, and updating the share bar graphical element to indicate that three content items of the first content item type have been selected for sharing.

18. The system of claim 15, wherein the second content item type represents a folder.

19. The system of claim 15, wherein functionality of the share bar is facilitated using a content management system.

20. The system of claim 19, wherein the native application interface includes a field configured to receive a message associated with the first identifier and the second identifier, and wherein the content management system transmits the message to identified recipients associated with the selected content items.

* * * * *